U S009623928B2

(12) United States Patent
Mori

(10) Patent No.: US 9,623,928 B2
(45) Date of Patent: Apr. 18, 2017

(54) ROLLING TYPE VEHICLE

(71) Applicant: HONDA MOTOR CO., LTD., Tokyo (JP)

(72) Inventor: Yotaro Mori, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/016,862

(22) Filed: Feb. 5, 2016

(65) Prior Publication Data
US 2016/0229480 A1 Aug. 11, 2016

(30) Foreign Application Priority Data
Feb. 10, 2015 (JP) ................. 2015-024459

(51) Int. Cl.
*B62K 5/10* (2013.01)
*B62K 5/08* (2006.01)
(Continued)

(52) U.S. Cl.
CPC ................. *B62K 5/10* (2013.01); *B60G 3/20* (2013.01); *B60G 7/02* (2013.01); *B62D 9/02* (2013.01);
(Continued)

(58) Field of Classification Search
CPC . B62K 5/10; B62K 5/05; B62K 5/027; B62K 5/08; B62K 2025/044; B62K 2005/001; B62D 9/02; B60G 7/02; B60G 3/20; B60G 2202/42; B60G 2400/60; B60G 2206/50; B60G 2202/442; B60G 2204/45; B60G 2204/418; B60G 2204/116; B60G 2206/124; B60G 2204/42; B60G 2200/44; B60G 2300/45; B60G 2200/184; B60G 2300/122; B60G 2204/143
See application file for complete search history.

(56) References Cited

U.S. PATENT DOCUMENTS

2011/0006498 A1* 1/2011 Mercier .................... B62D 9/02
280/124.103
2015/0210338 A1* 7/2015 Iizuka ...................... B60G 3/01
280/267
(Continued)

FOREIGN PATENT DOCUMENTS

JP 2003-535742 A 12/2013
WO WO 01/92084 A1 12/2001

*Primary Examiner* — Drew Brown
(74) *Attorney, Agent, or Firm* — Birch, Stewart, Kolasch & Birch, LLP

(57) ABSTRACT

A rolling vehicle includes a pair of left and right front wheels and a pair of left and right arm members swingably supported by the vehicle body on inner sides in the transverse direction and which support the left and right front wheels in a steerable manner on outer sides in the transverse direction. As viewed from the direction along the axis of a support shaft which supports the left and right arm members on the vehicle body, the base portions of the left and right arm members rotatably supported on the vehicle body side overlap with each other, whereas the swinging center axis of the base portion of the left arm and the swinging center axis of the base portion of the right arm, of the base portions of the left and right arm members, are out of alignment with each other.

20 Claims, 17 Drawing Sheets

(51) Int. Cl.
*B62K 5/027* (2013.01)
*B62K 5/05* (2013.01)
*B60G 3/20* (2006.01)
*B60G 7/02* (2006.01)
*B62D 9/02* (2006.01)
*B62K 5/00* (2013.01)
*B62K 25/04* (2006.01)

(52) U.S. Cl.
CPC ............... *B62K 5/027* (2013.01); *B62K 5/05* (2013.01); *B62K 5/08* (2013.01); *B60G 2200/184* (2013.01); *B60G 2200/44* (2013.01); *B60G 2202/42* (2013.01); *B60G 2202/442* (2013.01); *B60G 2204/116* (2013.01); *B60G 2204/143* (2013.01); *B60G 2204/418* (2013.01); *B60G 2204/42* (2013.01); *B60G 2204/45* (2013.01); *B60G 2206/124* (2013.01); *B60G 2206/50* (2013.01); *B60G 2300/122* (2013.01); *B60G 2300/45* (2013.01); *B60G 2400/60* (2013.01); *B62K 2005/001* (2013.01); *B62K 2025/044* (2013.01)

(56) References Cited

U.S. PATENT DOCUMENTS

| | | | |
|---|---|---|---|
| 2016/0137251 A1* | 5/2016 | Mercier | B62K 5/05 180/210 |
| 2016/0144680 A1* | 5/2016 | Simon | B60G 3/20 280/124.103 |
| 2016/0152291 A1* | 6/2016 | Sasaki | B62K 5/08 180/210 |
| 2016/0152293 A1* | 6/2016 | Hirayama | B62K 5/05 280/124.103 |
| 2016/0229246 A1* | 8/2016 | Mori | B60G 3/26 |
| 2016/0229249 A1* | 8/2016 | Mori | B62D 7/18 |
| 2016/0229251 A1* | 8/2016 | Mori | B60G 13/003 |
| 2016/0229480 A1* | 8/2016 | Mori | B62D 9/02 |
| 2016/0251051 A1* | 9/2016 | Malphettes | B60G 3/20 |
| 2016/0264110 A1* | 9/2016 | Seto | B60T 8/1755 |
| 2016/0272264 A1* | 9/2016 | Mogensen | B60G 21/007 |
| 2016/0347295 A1* | 12/2016 | Seto | B60T 8/246 |

* cited by examiner

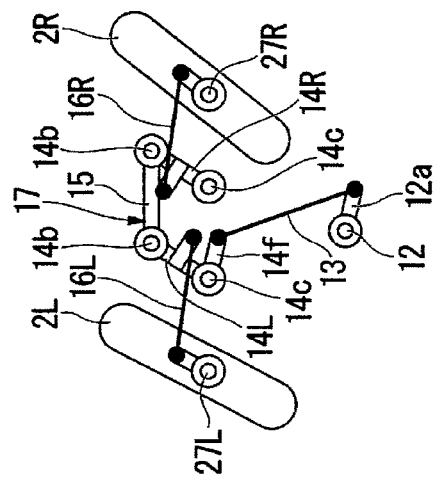
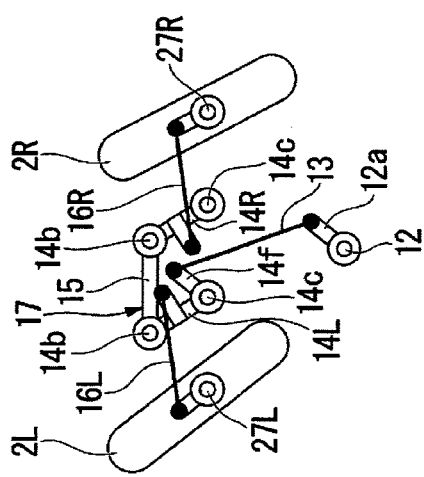
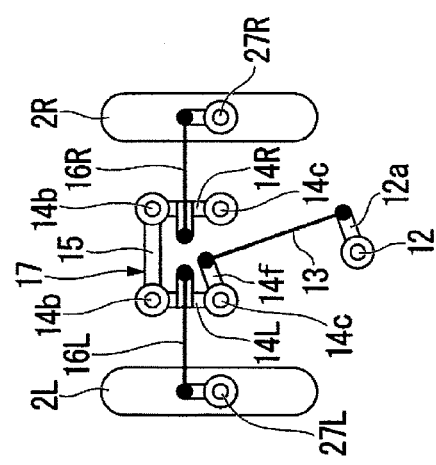
FIG. 7(a)
FIG. 7(b)
FIG. 7(c)

ROLLING TYPE VEHICLE

CROSS-REFERENCE TO RELATED APPLICATIONS

The present application claims priority under 35 USC 119 to Japanese Patent Application No. 2015-024459 filed Feb. 10, 2015 the entire contents of which are hereby incorporated by reference.

BACKGROUND OF THE INVENTION

1. Field of the Invention

The present invention relates to a rolling type vehicle.

2. Description of Background Art

Rolling type vehicles are know that include a pair of left and right front wheels and in which a vehicle body is capable of lateral swinging, or rolling. See, for example, JP-T-2003-535742 A. The rolling type vehicle disclosed in JP-T-2003-535742 A includes a pair of left and right front wheels, a pair of left and right cross bars for swingably supporting the left and right front wheels and a rocking lever wherein left and right outer end portions are connected to the left and right cross bars through shock absorber struts, respectively. The axes of fulcrum pins of the pair of left and right cross bars and the axis of a pin of the rocking lever are disposed on the same plane.

In the configuration wherein the axes of the fulcrum pins of the left and right cross bars and the axis of the pin of the rocking lever are disposed on the same plane, however, the positions of the axes are set at predetermined positions, which limits the degree of freedom of layout. In addition, there is a limitation to enlargement of the length of left and right arms.

SUMMARY AND OBJECTS OF THE INVENTION

Accordingly, it is an object of an embodiment of the present invention to enlarge the length of left and right arms while enhancing the degree of freedom of layout, in a rolling type vehicle which has a pair of left and right front wheels and in which a vehicle body is capable of rolling.

As a solution to the above problem, according to an embodiment of the present invention, there is provided a rolling type vehicle (1) having a pair of left and right front wheels (2L, 2R) and having a vehicle body (1A) capable of rolling. The rolling type vehicle (1) includes a pair of left and right arm members (21, 23) supported in a swingable manner by the vehicle body (1A) on inner sides in a transverse direction for supporting the left and right front wheels (2L, 2R) in a steerable manner on outer sides in the transverse direction. In the rolling type vehicle (1), as viewed from a direction along an axis (C2, C3) of a support shaft (22, 24) which supports the left and right arm members (21, 23) on the vehicle body (1A), those base portions (21a, 21b, 23a, 23b) of the left and right arm members (21, 23) which are rotatably supported on the vehicle body (1A) side overlap with each other, whereas a swinging center axis (C11) of the base portion (21aL, 21bL) of the left arm (21L) and a swinging center axis (C12) of the base portion (21aR, 21bR) of the right arm (21R), of the base portions (21a, 21b, 23a, 23b) of the left and right arm members (21, 23), are out of alignment with each other.

According to an embodiment of the present invention, the swinging center axis (C11) of the left arm (21L) is disposed on the right side of a longitudinally extending vehicle body center line (CL), while the swinging center axis (C12) of the right arm (21R) is disposed on the left side of the longitudinally extending vehicle body center line (CL).

According to an embodiment of the present invention, the left and right arm members (21, 23) each include an upper arm (21) and a lower arm (23) and the distance (L1) from an axle center (C5) of the front wheel (2L, 2R) to a transversely outer end portion (21c) of the upper arm (21) and the distance (L2) from the axle center (C5) to a transversely outer end portion (23c) of the lower arm (23) are different from each other. In addition, the swinging center axes (C11, C12) of those ones of the upper arms (21) and the lower arms (23) which correspond to the greater one of the distances (L1, L2) are deviated from each other in transverse direction, as viewed from a direction along the axis (C2, C3) of the support shaft (22, 24).

According to an embodiment of the present invention, the distance (L2) for the lower arm (23) is set smaller than the distance (L1) for the upper arm (21); and the swinging center axes (C11, C12) of the left and right upper arms (21) are out of alignment with each other, as viewed from a direction along the axis (C2, C3) of the support shaft (22, 24).

According to an embodiment of the present invention, the base portion (21aL, 21bL) of the left arm (21L) and the base portion (21aR, 21bR) of the right arm (21R) are supported by eccentric collars (50) fitted on the same support shaft (22).

According to an embodiment of the present invention, as viewed from the direction along the axis of the support shaft which supports the pair of left and right arm members on the vehicle body, those base portions of the left and right arm members which are rotatably supported on the vehicle body side overlap with each other, whereas the swinging center axis of the base portion of the left arm and the swinging center axis of the base portion of the right arm, of the base portions of the left and right arm members, are out of alignment with each other. Owing to this configuration, it is ensured that the positions of the swinging center axes of the base portions of the left and right arms can be set more freely within a range in which the base portions of the arm members overlap with each other, as viewed from the direction along the axis of the support shaft, as compared with the case where the swinging center axis of the base portion of the left arm and the swinging center axis of the base portion of the right arm coincide with each other as viewed from the direction along the axis of the support shaft. As a consequence, the length of the left and right arms can be enlarged while enhancing the degree of freedom of layout.

According to an embodiment of the present invention, the axis of the swinging center axis of the left arm is disposed on the right side of the longitudinally extending vehicle body center line, whereas the swinging center axis of the right arm is disposed on the left side of the longitudinally extending vehicle body center line. This enables the length of the left and right arms to be enlarged effectively, as compared with the case where the swinging center axis of the left arm is disposed on the left side of the longitudinally extending vehicle body center line whereas the swinging center axis of the right arm is disposed on the right side of the longitudinally extending vehicle body center line. In addition, it is possible to reduce the length of the left and right arm members in the vehicle width direction (the whole width) and, therefore, to reduce the vehicle width, as compared with the case where the swinging center axis of the left arm is disposed on the left side of the longitudinally extending vehicle body center line whereas the swinging center axis of the right arm is disposed on the right side of the longitudinally extending vehicle body center line.

According to an embodiment of the present invention, the swinging center axes of those ones one of the upper arms and the lower arms which correspond to the greater one of the above-mentioned distances are out of alignment with each other, as viewed from the direction along the axis of the support shaft. Owing to this configuration, clearance can be secured between those ones of the upper arms and lower arms which are liable to interfere with component parts surrounding the front wheels at the time of swinging of the arm members and the surrounding component parts. As a result, interference among vehicle component parts can be avoided effectively.

According to an embodiment of the present invention, the above-mentioned distance for the lower arms is set smaller than the above-mentioned distance for the upper arms. This ensures that a minimum road clearance can be secured more easily as compared with the case where the distance for the lower arms is set greater than the distance for the upper arms. With the swinging center axes of the left and right upper arms set out of alignment with each other as viewed from the direction along the axis of the support shaft, clearance can be secured between the upper arms (which are liable to interfere with the component parts surrounding the front wheels at the time of swinging of the arm members) and the surrounding component parts, so that interference among vehicle component parts can be avoided effectively. Therefore, interference among vehicle component parts can be obviated effectively while securing a minimum road clearance.

According to an embodiment of the present invention, the base portion of the left arm and the base portion of the right arm are supported by the eccentric collars fitted to the same support shaft. With this configuration, it is possible to enlarge the length of the left and right arms by just a required amount without an increase in weight, as compared with the case where the number of the support shafts is increased by, for example, providing the support shafts on the basis of each of the left arm and the right arm.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 7(a), 7(b) and 7(c) illustrates a steering link mechanism of the two-front-wheel suspension system, wherein 7(a) depicts a state when a turning angle is 0 degrees, 7(b) depicts a state at the time of steering to the left, and 7(c) depicts a state at the time of steering to the right;

DETAILED DESCRIPTION OF THE PREFERRED EMBODIMENTS

Figure 1:
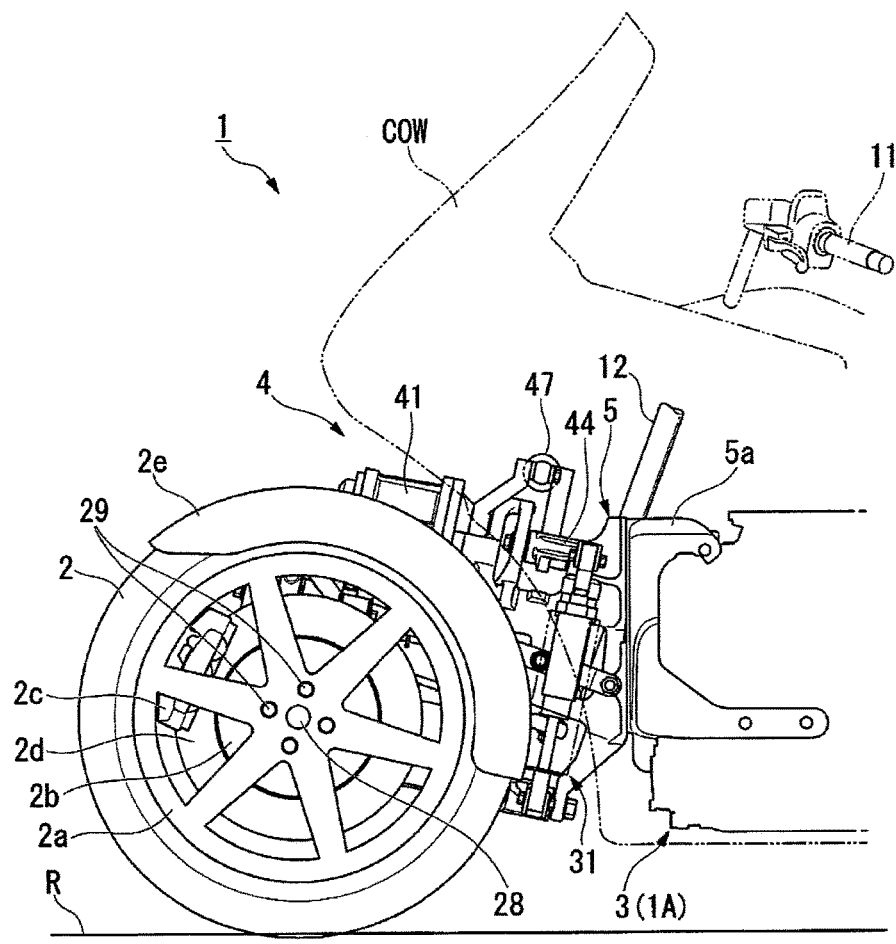
FIG. 1 is a left side view of a vehicle body front portion of a two-front-wheeled saddle type vehicle in one embodiment of the present invention.

An embodiment of the present invention will be described below, referring to the drawings. It is to be noted that the directions such as forward, rearward, leftward and rightward directions in the following description are the same as those directions with reference to a vehicle described hereinbelow, unless otherwise specified. In addition, at appropriate locations in the drawings used in the following description, there are shown an arrow FR indicative of the front side of the vehicle, an arrow LH indicative of the left-hand side of the vehicle, and an arrow UP indicative of the upper side of the vehicle. In addition, line CL in the drawings is a longitudinally extending vehicle body center line.

FIG. 1 shows a vehicle body front portion of a saddle type vehicle 1 in the present embodiment. The saddle type vehicle 1 is a two-front-wheeled three-wheel rolling type vehicle which includes a pair of left and right front wheels (steered wheels) 2 in left-right symmetry at vehicle body front portions, and a rear wheel (not shown) as a single driving wheel at a vehicle body rear portion, and which is capable of lateral swinging (rolling) of the vehicle body with the left and right front wheels 2 in a set state. Symbol COW in the drawing indicates a cowling which covers a vehicle body front portion of the saddle type vehicle 1.

In the following, unless otherwise specified, description will be made of a configuration in a condition where the left and right front wheels 2 are grounded on a horizontal road surface R, the vehicle body is in a 1 G condition in which a load corresponding to the vehicle weight is exerted on a two-front-wheel suspension system 4 (described later), the vehicle body is in an upright state with a roll angle of 0 degrees, and the left and right front wheels 2 are in a straight ahead state with a steering angle of 0 degrees. The configuration described below is in left-right symmetry about the center in the transverse direction, unless specified otherwise. In the present embodiment, the left-hand component of a configuration composed of a pair of left and right components may be denoted by a symbol attended by "L," and the right-hand component may be denoted by a symbol attended by "R" for distinguishing the components, and they may be denoted by only the symbol not attended by "L" or "R."

Figure 2:
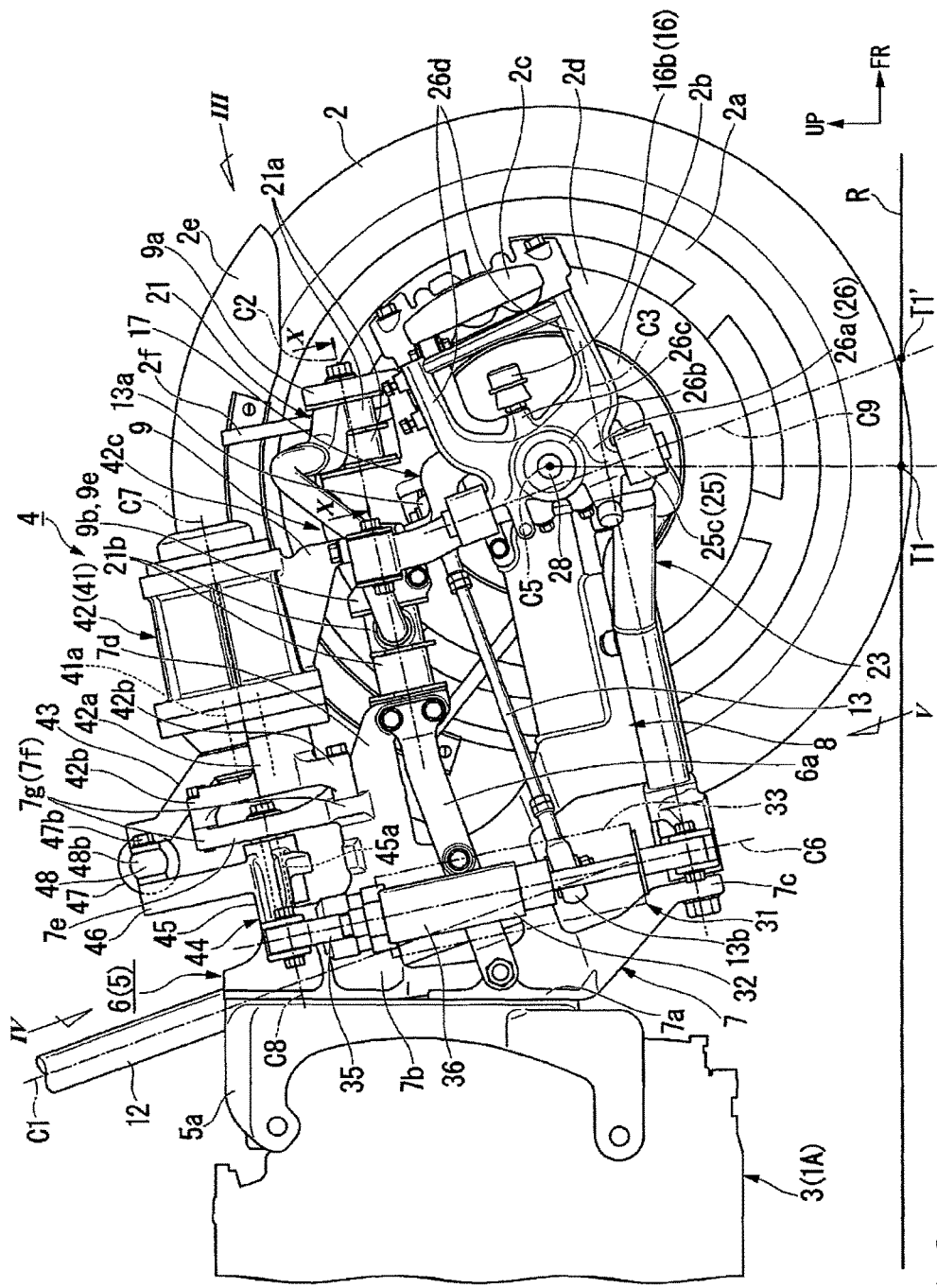
FIG. 2 is a right side view of a two-front-wheel suspension system of the saddle type vehicle in a state where a right front wheel has been removed.
Figure 3:
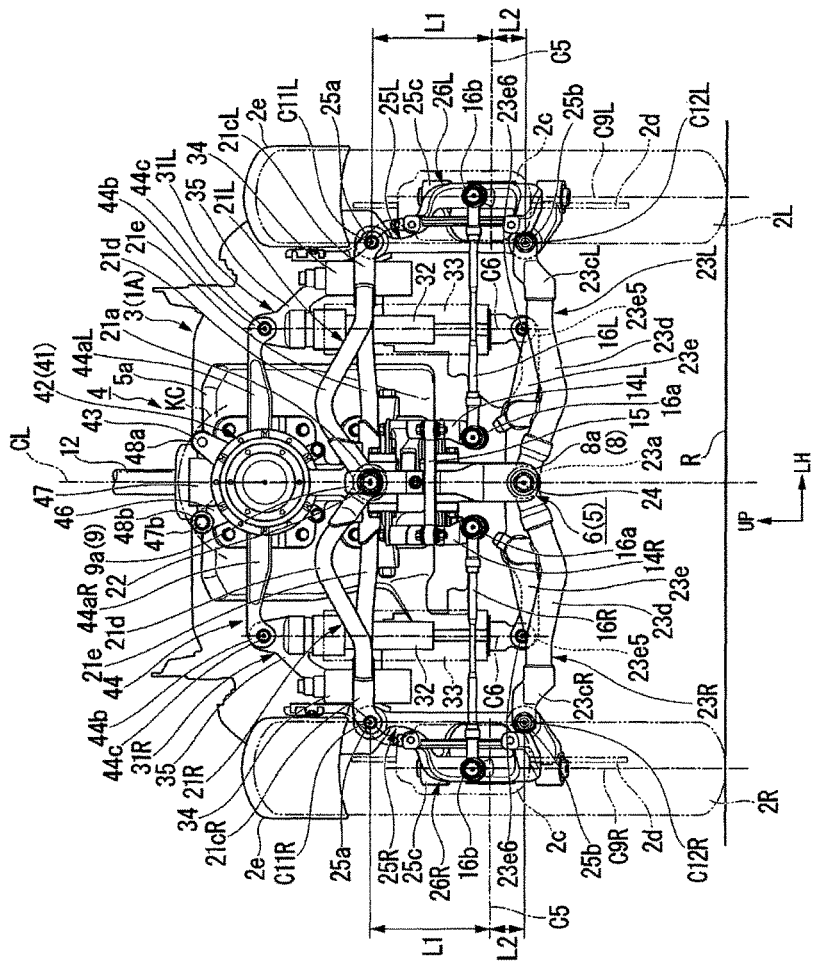
FIG. 3 is a view along arrow III of FIG. 2 (a front view as viewed from an axial direction of upper and lower roll shafts)
Figure 6:
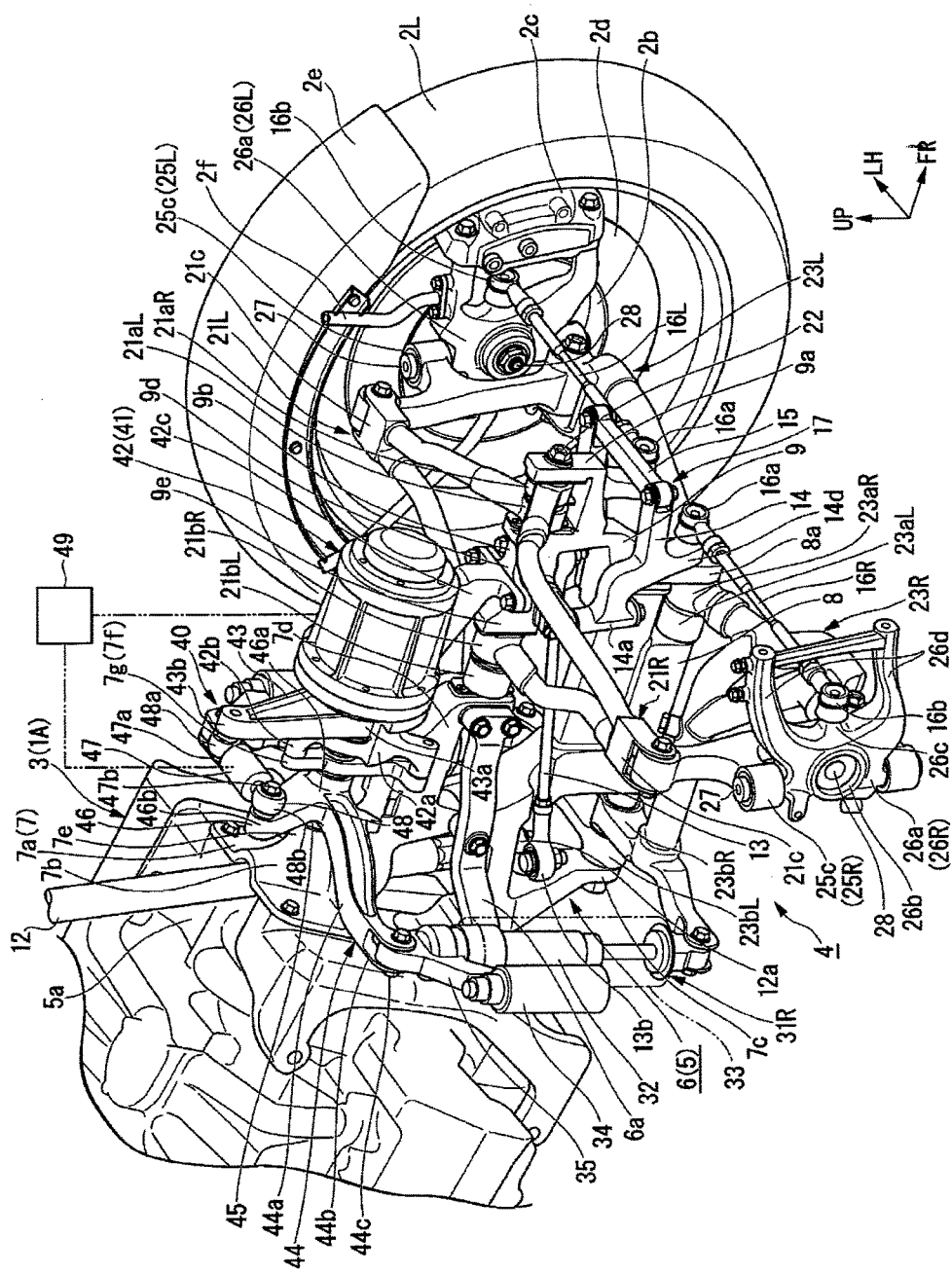
FIG. 6 is a perspective view of the two-front-wheel suspension system.

Referring to FIGS. 2, 3 and 6 in combination, the saddle type vehicle 1 has a configuration in which a front suspension frame body 5 supporting the two-front-wheel suspension system 4 is fixed to a front portion of, for example, a horizontal opposed engine 3 mounted in a center of the vehicle body. On the front suspension frame body 5, a lower portion of a steering shaft 12 extending vertically in a center in the transverse direction (in a center in the vehicle width direction) is rotatably supported. A bar-type steering handle, or steering handlebar, 11 is mounted to an upper end portion of the steering shaft 12.

The steering shaft 12 has its center axis (steering axis) C1 disposed on a longitudinally extending vehicle body center line CL. The steering axis C1 is inclined so that its upper-side portion is located on the rear side with reference to the vertical direction in side view. To a lower end portion of the steering shaft 12, a base end portion of a bottom bracket 12a is fixed. To a tip portion of the bottom bracket 12a, a rear end portion of a link rod 13 extending in the longitudinal vehicle direction is connected. To a front end portion of the link rod 13, a steering link mechanism 17 is connected. To the steering link mechanism 17, left and right knuckle members 26L and 26R are connected through left and right tie rods 16L and 16R, respectively. On the left and right knuckle members 26L and 26R, the left and right front wheels 2L and 2R are rotatably supported, respectively. Rotation of the steering handlebar 11 and steering of the left and right front wheels 2L and 2R are interlocked with each other through the steering shaft 12, the link rod 13, the steering link mechanism 17, the left and right tie rods 16L and 16R and the left and right knuckle members 26L and 26R.

Referring to FIGS. 2, 3 and 6, the two-front-wheel suspension system 4 enables the vehicle body 1A inclusive of the front suspension frame body 5 and the engine 3 and the like to roll with the left and right front wheels 2L and 2R kept grounded, and enables the left and right front wheels 2L and 2R to similarly roll in accordance with the rolling of the vehicle body 1A. By contrast, the two-front-wheel suspension system 4 enables the left and right front wheels 2L and 2R to alternately move up and down with reference to the vehicle body 1A.

The two-front-wheel suspension system 4 is in a double wishbone form in which the left and right front wheels 2L and 2R are independently suspended, and in which outer link members 25 are supported through upper arms 21 and lower arms 23 on left and right sides of the front suspension frame body 5 extending forwardly of the steering shaft 12 in the center of the vehicle width direction. On the left and right outer link members 25L and 25R, the left and right knuckle members 26L and 26R and the front wheels 2L and 2R are supported in a steerable manner, respectively.

Those inner end portions of the left and right upper arms 21L and 21R which are located at the center in the vehicle width direction are supported on an upper portion of the front suspension frame body 5 in a vertically swingable manner through an upper roll shaft 22 extending substantially in the longitudinal direction of the vehicle. Those inner end portions of the left and right lower arms 23L and 23R which are located at the center in the vehicle width direction are supported on a lower portion of the front suspension frame body 5 in a vertically swingable manner through a lower roll shaft 24 parallel to the upper roll shaft 22. Axes C2 and C3 of the upper and lower roll shafts 22 and 24 are disposed in a forwardly upwardly inclined posture with a smaller inclination angle with reference to the horizontal direction as compared with a direction which is orthogonal to the axis C1 of the steering shaft 12 in side view.

On outer end portions of the left and right upper arms 21L and 21R, upper end portions of the left and right outer link members 25L and 25R are supported in a swingable manner through an upper outer swing shaft 25a parallel to the upper and lower roll shafts 22 and 24. On outer end portions of the left and right lower arms 23L and 23R, lower end portions of the left and right outer link members 25L and 25R are supported in a swingable manner through a lower outer swing shaft 25b parallel to the upper and lower roll shafts 22 and 24.

Figure 8:
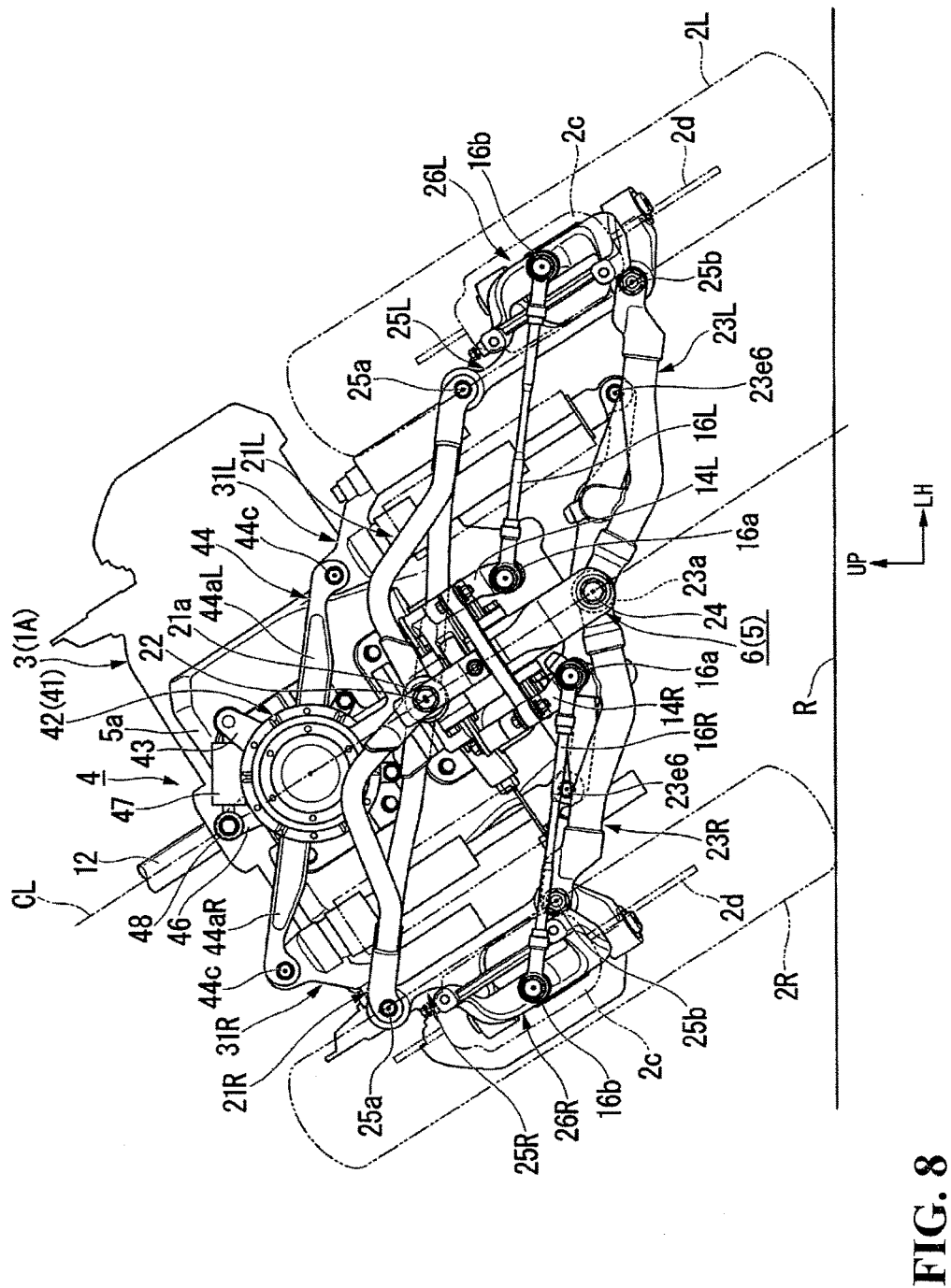
FIG. 8 is a view along an arrow corresponding to FIG. 3, showing a state where a vehicle body rolls to the right side.

As viewed along the axial direction of the upper and lower roll shafts 22 and 24, all the left and right upper arms 21L and 21R, the left and right lower arms 23L and 23R and the left and right outer link members 25L and 25R are disposed in the forms of parallel links on the left and right sides of the vehicle body, respectively. This configuration ensures that when the left and right upper arms 21L and 21R and the left and right lower arms 23L and 23R swing vertically, the left and right outer link members 25L and 25R, the left and right knuckle members 26L and 26R and the left and right front wheels 2L and 2R are moved up and down in a substantially parallel manner (see FIG. 8).

In addition, as viewed along the axial direction of the upper and lower roll shafts 22 and 24, the left and right tie rods 16L and 16R are also provided to be substantially parallel to and equal in length to the left and right upper arms 21L and 21R and the left and right lower arms 23L and 23R. These members are disposed in the forms of parallel links on the left and right sides of the vehicle body, respectively. This configuration ensures that when the left and right upper arms 21L and 21R and the left and right lower arms 23L and 23R swing up and down, the left and right tie rods 16L and 16R also swing up and down substantially in parallel to the left and right upper arms 21L and 21R and the left and right lower arms 23L and 23R, thereby suppressing the influence on the steering angles of the left and right front wheels 2L and 2R.

Left and right shock absorber units 31L and 31R which bear loads on the left and right front wheels 2L and 2R respectively extend substantially vertically, on the upper side of rear portions of the left and right lower arms 23L and 23R. The left and right shock absorber units 31L and 31R have their lower end portions connected respectively to the left and right lower arms 23L and 23R, and have their upper end portions connected respectively to left and right end portions of a shock absorber support arm 44 which extends substantially in the transverse direction. The shock absorber support arm 44 has a configuration wherein its base portion 45 (shaft support portion) at the center in the transverse direction is supported on the front suspension frame body 5 in a swingable manner through a shock absorber swing shaft 45a parallel to the upper and lower roll shafts 22 and 24.

Left and right arm portions 44aL and 44aR integrally possessed by the shock absorber support arm 44 are disposed in the forms of parallel links on the left and right sides of the vehicle body together with the left and right lower arms 23L and 23R and the left and right shock absorber units 31L and 31R.

Figure 9:
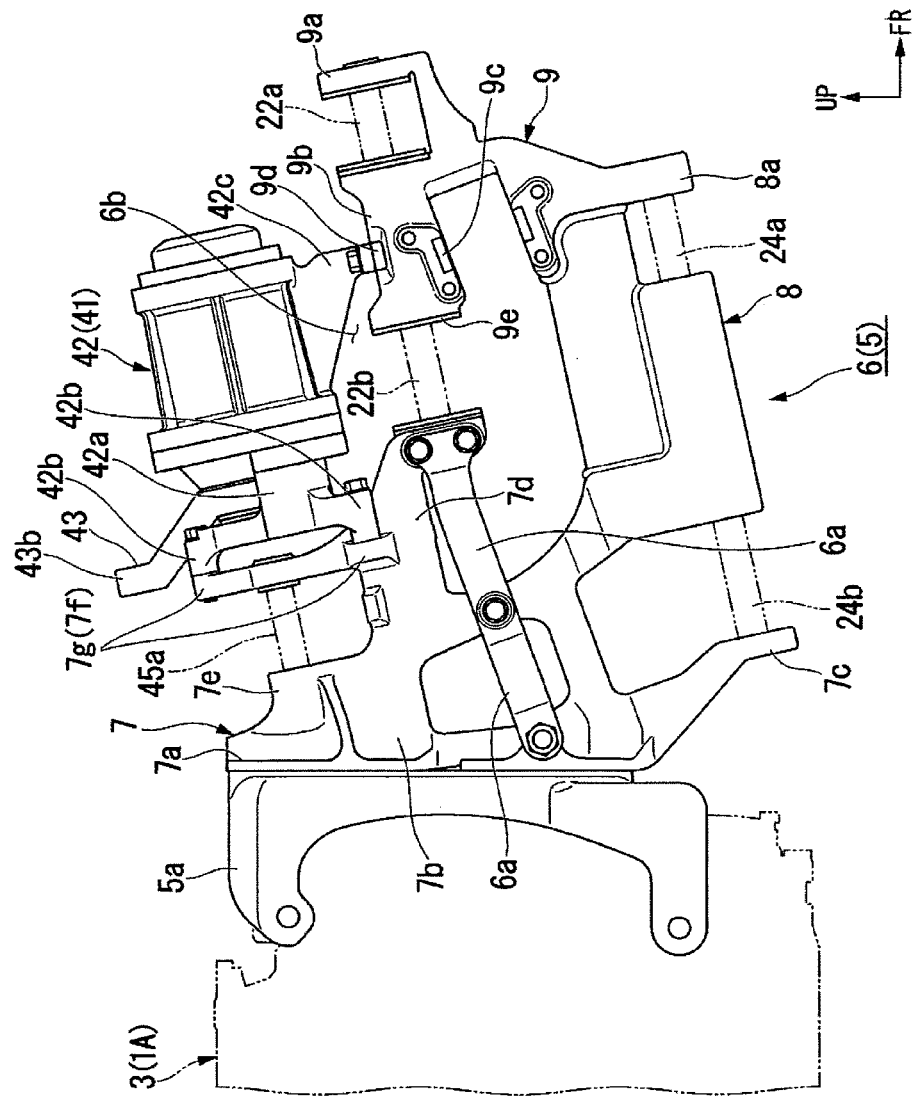
FIG. 9 is a right side view of a front suspension frame body.

Referring to FIGS. 2, 6 and 9, the front suspension frame body 5 is fixed to a front portion of the engine 3 through a mount frame 5a. The front suspension frame body 5 includes a frame main body 6 which is disposed at the center in the vehicle width direction and which has a gate-like shape opening upward in side view, and a pair of left and right reinforcement beams 6a arranged between left and right outside portions of the frame main body 5 and the mount frame 5a. The front suspension frame body 5 is provided to be forwardly upwardly inclined as a whole. The frame main body 6 and the left and right reinforcement beams 6a are provided in an integral fashion by forming integrally from a metallic material or by joining a plurality of members by welding, fastening or the like. The inclination of the front suspension frame body 5 is such that the front suspension frame body 5 is substantially parallel to the roll shafts 22 and 24 of the upper arms 21 and the lower arms 23.

The frame main body 6 is provided in a flat shape suppressed in a transverse dimension. The frame main body 6 includes a rear side portion 7, a lower side portion 8 and a front side portion 9 which form the gate-like shape. The upper opening portion of the gate-like shape of the frame main body 6 is indicated by symbol 6b.

The rear side portion 7 includes a mount connection portion 7a connected and fixed to a substantially vertical front surface portion of the mount frame 5a; a shaft support portion 7b for supporting a lower portion of the steering shaft 12 for rotation about the steering axis C1 and a lower arm rear support portion 7c for supporting rear base portions 23bL and 23bR of the left and right lower arms 23L and 23R of the two-front-wheel suspension system 4 for vertical swinging; a forward extending portion 7d extending to the front side of the shaft support portion 7b. A shock absorber arm support portion 7e is provided on the upper side of the front extending portion 7d with an actuator rear end support portion 7f provided on the front side of the shock absorber arm support portion 7e.

The lower arm rear support portion 7c has a gate-like shape opening downward in side view for supporting the rear base portions 23bL and 23bR of the left and right lower arms 23L and 23R on the lower side thereof. The rear base portions 23bL and 23bR of the left and right lower arms 23L and 23R are disposed to be aligned in a front-rear relationship. The rear base portions 23bL and 23bR are supported by the lower arm rear support portion 7c through a lower roll shaft 24b which is forwardly upwardly inclined. In a space on the upper side of the lower arm rear support portion 7c, there are disposed a lower end portion of the steering shaft 12 which penetrates the shaft support portion 7b downward and the bottom bracket 12a.

The forward extending portion 7d extends substantially in parallel to the upper and lower roll shafts 22 and 24. The shock absorber arm support portion 7e over the forward extending portion 7d has a gate-like shape opening to the upper side in a side view. The base portion 45 at the center in the transverse direction of the shock absorber support arm 44 extending in the transverse direction is disposed on the upper side of the shock absorber arm support portion 7e. The base portion 45 of the shock absorber support arm 44 is supported by the shock absorber arm support portion 7e of the frame main body 6 through the shock absorber swing shaft 45a which is forwardly upwardly inclined to be parallel to the upper and lower roll shafts 22 and 24. Front end portions of the left and right reinforcement beams 6a are connected and fixed to left and right outer sides of a front end portion of the forward extending portion 7d by fastening or the like. Rear end portions of the left and right reinforcement beams 6a are connected and fixed to left and right outer sides of the rear side portion 7 in the vicinity of the mount frame 5a by fastening or the like.

To the actuator rear end support portion 7f on the front side of the shock absorber arm support portion 7e, a rear end portion 42a of a housing 42 of an actuator 41 is connected and fixed. The housing 42 of the actuator 41 has a hollow cylindrical shape parallel to and coaxial with the shock absorber swing shaft 45a. The housing 42 is provided in an integral form by, for example, integrally forming from a metallic material or joining a plurality of members by welding, fastening or the like. At the outer circumference of the rear end portion 42a of the housing 42, a plurality of rear end mount portions 42b are integrally provided. At the outer circumference of the actuator rear end support portion 7f of the frame main body 6, a plurality of frame-side mount portions 7g corresponding to the rear end mount portions 42b of the housing 42 are integrally provided. To each of the frame-side mount portions 7g, the corresponding rear end mount portion 42b is connected and fixed by fastening or the like.

The lower side portion 8 of the frame main body 6 extend obliquely forwardly upwardly in parallel to the upper and lower roll shafts 22 and 24. On the lower side of a front end portion of the lower side portion 8, there is provided a lower arm front support portion 8a wherein front base portions 23aL and 23aR of the left and right lower arms 23L and 23R are supported so that they can swing up and down. The lower arm front support portion 8a has a gate-like shape opening to the lower side in side view, and supports the front base portions 23aL and 23aR of the left and right lower arms 23L and 23R in the inside thereof.

The front base portions 23aL and 23aR of the left and right lower arms 23L and 23R are disposed to be aligned in a front-rear relationship. The front base portions 23aL and 23aR are supported by the lower arm front support portion 8a through a lower roll shaft 24a which is inclined forwardly upward. The lower roll shaft 24a is coaxial with the lower roll shaft 24b of the lower arm rear support portion 7c, and they are configured as the integral lower roll shaft 24 from, for example, an elongate shaft penetrating a lower portion of the frame main body 6 in the longitudinal vehicle direction. It is to be noted that the lower roll shafts 24a and 24b may be formed as separate bodies from each other.

The front side portion 9 of the frame main body 6 includes an upper arm front support portion 9a which is provided at the front side of an upper end portion of the front side portion 9 and which supports front base portions 21aL and 21aR of the left and right upper arms 21L and 21R in a vertically swingable manner with a rearward extending portion 9b extending to the rear side of the upper arm front support portion 9a. A link support portion 9c is provided at a lower portion of the rearward extending portion 9b with an actuator front lower support portion 9d which is provided at an upper portion of the rearward extending portion 9b and which supports the lower side of a front portion of the housing 42 of the actuator 41.

At the lower side of the front portion of the housing 42, a front lower mount portion 42c is integrally provided. The front lower mount portion 42c is connected and fixed to the actuator front lower support portion 9d of the frame main body 6 by fastening or the like. The upper opening portion 6b of the frame main body 6 having the gate-like shape in side view is closed up by the housing 42 of the actuator 41, whereby the front suspension frame body 5 having a closed loop structure which is closed in side view is configured. More specifically, the housing 42 of the actuator 41 functions also as part of the front suspension frame body 5 of the vehicle body 1A.

A rear end portion of the rearward extending portion 9b, together with a front end portion of the forward extending portion 7d of the rear side portion 7, constitutes an upper arm rear support portion 9e which supports rear base portions 21bL and 21bR of the left and right upper arms 21L and 21R in a vertically swingable manner.

The rear base portions 21bL and 21bR of the left and right upper arms 21L and 21R are disposed to be aligned in a front-rear relationship. The rear base portions 21bL and 21bR are supported by the upper arm rear support portion 9e through an upper roll shaft 22b which is inclined forwardly upward. The front base portions 21aL and 21aR of the left and right upper arms 21L and 21R are disposed to be aligned in a front-rear relationship. The front base portions 21aL and 21aR are supported by the upper arm front support portion 9a through an upper roll shaft 22a which is inclined forwardly upward. The upper roll shafts 22a and 22b are coaxial with each other, and are configured as the integral upper roll shaft 22 from, for example, an elongate shaft which penetrates an upper portion of the frame main body 6 in the front-rear direction. It is to be noted that the upper roll shafts 22a and 22b may be formed as separate bodies from each other.

Onto the upper roll shaft 22 having the center axis C2 disposed on the longitudinally extending vehicle body center line CL, the front base portions 21aL and 21aR and the rear base portions 21bL and 21bR of the left and right upper arms 21L and 21R are individually supported through eccentric collars (not shown). The left and right upper arms 21L and 21R swing about bearings externally fitted to the eccentric collars, whereby the swinging centers of the left and right upper arms 21L and 21R can be a little offset in the vehicle width direction from the axial center of the upper roll shaft 22. More specifically, the swinging center of the left upper arm 21L is offset to the right side of the axis C2 of the upper roll shaft 22, whereas the swinging center of the right upper arm 21R is offset to the left side of the axis C2 of the upper roll shaft 22. It is to be noted that the swinging center axis C3 of the left and right lower arms 23L and 23R (corresponding to the center axis C3 of the lower roll shaft 24) is disposed on the longitudinally extending vehicle body center line CL.

Figure 4:
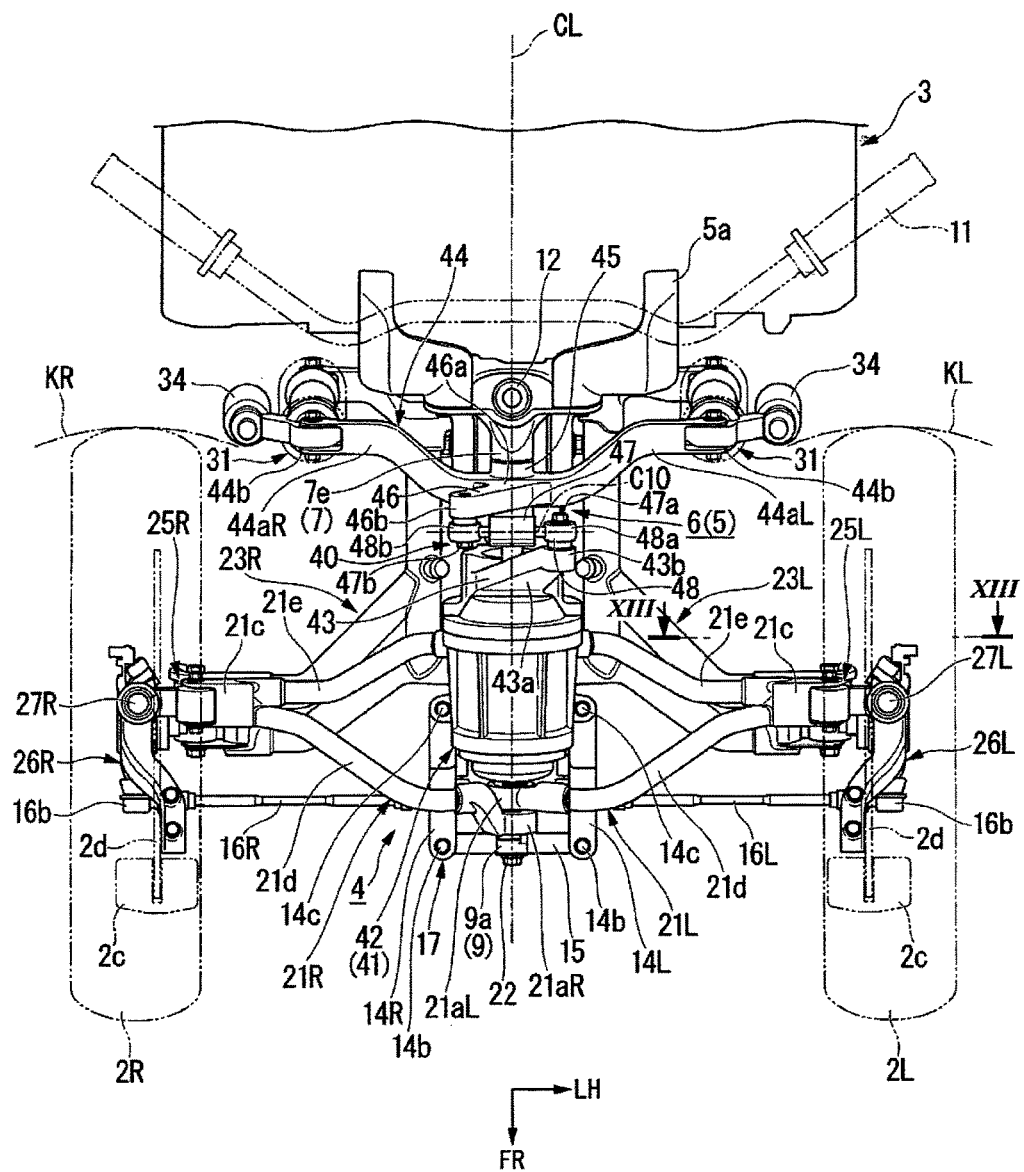
FIG. 4 is a view along arrow IV of FIG. 2 (a top plan view as viewed from an axial direction of a steering shaft)

Referring to FIGS. 2, 4 and 6, the actuator 41 is an electric motor or fluidic apparatus which generates a torque about a center axis C7 of the housing 42. The actuator 41 has, at a rear portion thereof, a front swing arm 43 which protrudes obliquely to a left upper rear side and which swings about the axis C7. A driving shaft (output portion) 41a is provided sharing the axis C7 in the actuator 41. The front swing arm 43 is fixed to the driving shaft 41a and swings about the axis C7. The front swing arm 43 and a rear swing arm 46 of the shock absorber support arm 44 are spaced from each other along the axial direction of the actuator 41. At a connection portion 40 between the front swing arm 43 and the rear swing arm 46, there is provided a connection device 47 (load detection unit) which enables the front and rear swing arms 43 and 46 to swing as one body. The connection device 47 functions also as a load detection unit which detects a load transmitted between the front and rear swing arms 43 and 46.

The connection device 47 has a hollow cylindrical shape. A center axis C10 of the connection device 47 is disposed to be orthogonal to the shock absorber swing shaft 45a and be along the vehicle width direction. The connection device 47 incorporates a load sensor for electrical detection of a load (torque) about the shock absorber swing shaft 45a which is generated between the front and rear swing arms 43 and 46. A detected value obtained by the detection is inputted to an ECU (Electronic Control Unit) 49 as a control unit for controlling the operation of the actuator 41. The ECU 49 controls the actuator 41, on the basis of the results of the detection by the connection device 47 functioning as the load detection unit.

The connection device 47 is connected so as to be rotatable relative to the front and rear swing arms 43 and 46. More specifically, the connection portion 40 is provided with a connection link 48 for connection between left and right outer end portions of the connection device 47 and tip portions 43b and 46b of the front and rear swing arms 43 and 46. The connection link 48, which extends along the vehicle width direction, is provided at left and right end portions thereof with left and right spherical bearings 48a and 48b as connection portions for connection with the tip portions 43b and 46b of the front and rear swing arms 43 and 46, respectively. Through the left spherical bearing 48a, the left end portion of the connection link 48 is connected to the tip portion 43b of the front swing arm 43 by a bolt 47a inserted from the rear side. More specifically, through the right spherical bearing 48b, the right end portion of the connection link 48 is connected to the tip portion 46b of the rear swing arm 46 by a bolt 47b inserted from the front side.

The front swing arm 43 extends by protruding obliquely toward a left upper rear side from a base portion 43a exposed to a shaft support portion of the driving shaft 41a, to reach the tip portion 43b which is connected to the left end portion of the connection link 48 through the left spherical bearing 48a. The rear swing arm 46 extends by protruding obliquely toward a right upper front side from a base portion 46a exposed to the shaft support portion 45 of the shock absorber swing shaft 45a, to reach the tip portion 46b which is connected to the right end portion of the connection link 48 through the right spherical bearing 48b.

As viewed from an axis C8 about which the shock absorber support arm 44 can swing, the base portion 43a of the front swing arm 43 is opposed to the base portion 46a of the rear swing arm 46, with a spacing therebetween in the direction along the axis C8.

Referring to FIG. 3, as the actuator 41 operates, the front swing arm 43 describes a circular arc-shaped trajectory KC centered on the swinging center (axis C7) of the front swing arm 43 of the actuator 41. As viewed from the axis C8, the tip portion 43b of the front swing arm 43 (the connection portion between the connection device 47 and the front swing arm 43) is positionally deviated from the tip portion 46b of the rear swing arm 46 (the connection portion between the connection device 47 and the rear swing arm 46) in a direction along the trajectory KC. More specifically, as viewed from the axis C8, the tip portion 43b of the front swing arm 43 is deviated to the left side from the longitudinally extending vehicle body center line CL, in the direction along the trajectory KC. The tip portion 46*b* of the rear swing arm 46 is deviated to the right side from the longitudinally extending vehicle body center line CL, in the direction along the trajectory KC.

The load about the shock absorber swing shaft 45*a* which is generated between the front and rear swing arms 43 and 46 is generated according to an operation resistance (torque) of the front swing arm 43 when the shock absorber support arm 44 is going to swing in relation to the actuator 41 supported on the vehicle body side. More specifically, when the vehicle body swings to the left and right (rolls), a load about the shock absorber swing shaft 45*a* is generated between the front and rear swing arms 43 and 46 in accordance with the operation resistance of the front swing arm 43. The ECU 49 controls the driving of the actuator 41 according to a detected value of the load. The ECU 49 can control the actuator 41 so as to reduce at least the load inputted from the rear swing arm 46 to the front swing arm 43, namely, the load inputted from the shock absorber support arm 44 to the actuator 41, of the load transmitted between the front and rear swing arms 43 and 46.

For example, from a detected value supplied from an inclination sensor (acceleration sensor) provided on the vehicle body, the ECU 49 detects a moment in a falling direction and a rising direction which acts on the vehicle body, and controls the driving of the actuator 41 so that the moment will not become excessively great.

It is to be noted that the ECU 49 may be so configured that, for example, when the saddle type vehicle 1 is in a stopped state or a low vehicle speed state, the ECU 49 controls the driving of the actuator 41 so as to maximize the resistance to rolling of the vehicle body, and when the saddle type vehicle 1 is in a middle or high vehicle speed state, the ECU 49 controls the driving of the actuator 41 so as to weaken the resistance to rolling of the vehicle body.

Referring to FIGS. 4 and 6, the upper arm 21 integrally includes the front and rear base portions 21*a* and 21*b* which are rotatably supported on upper portions of the frame main body 6; a link upper support portion 21*c* which rotatably supports an upper end portion of the outer link member 25 at a transversely outer end portion of the upper arm 21; a front arm body 21*d* arranged between the front base portion 21*a* and the link upper support portion 21*c*; and a rear arm body 21*e* arranged between the rear base portion 21*b* and a link upper member.

The front and rear base portions 21*a* and 21*b* are each formed in a hollow cylindrical shape parallel to the upper roll shaft 22. The upper roll shaft 22 is disposed to extend through the inside of the front and rear base portions 21*a* and 21*b*. In the present embodiment, the front and rear base portions 21*a*L and 21*b*L of the left upper arm 21L are aligned with the front and rear base portions 21*a*R and 21*b*R of the right upper arm 21R, so as to overlap with the latter from the rear side, and these base portions are supported by the frame main body 6 through the upper roll shaft 22. In other words, as viewed in the axial direction of the upper roll shaft 22 (as viewed from the direction along the axis C2), the front and rear base portions 21*a*L and 21*b*L of the left upper arm 21L and the front and rear base portions 21*a*R and 21*b*R of the right upper arm 21R overlap with each other.

The left and right upper arms 21L and 21R are so configured that the front and rear base portions 21*a* and 21*b* on the left side differ from those on the right side in front-rear-directional position, but that the link upper support portions 21*c* on the left and right sides are the same in front-rear-directional position. For this reason, the left and right upper arms 21L and 21R are formed in left-right asymmetry by making the front and rear arm bodies 21*d* and 21*e* different in a bent shape or the like.

Figure 5:
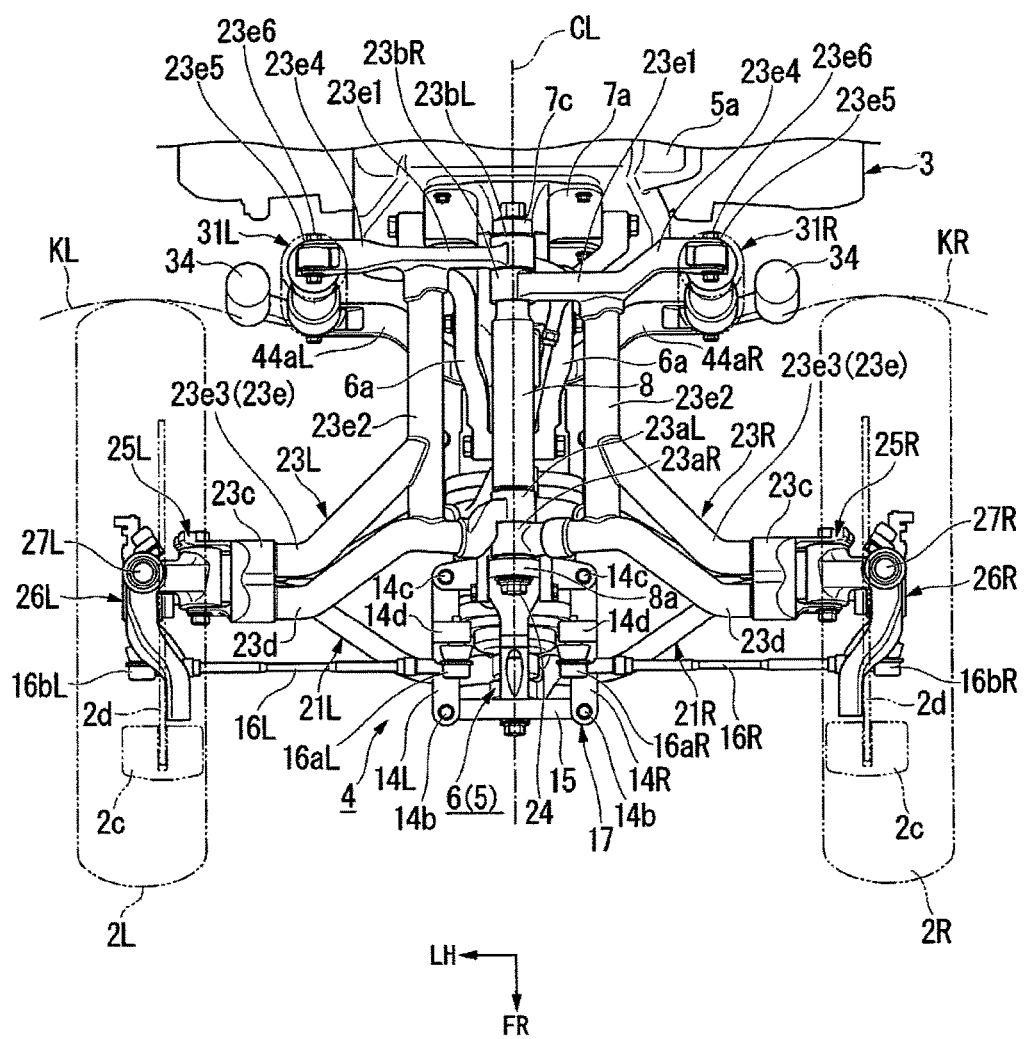
FIG. 5 is a view along arrow V of FIG. 2 (a bottom view as viewed from the axial direction of the steering shaft)

Referring to FIGS. 5 and 6, the lower arm 23 integrally includes the front and rear base portions 23*a* and 23*b* which are rotatably supported on lower portions of the frame main body 6; a link lower support portion 23*c* which rotatably supports a lower end portion of the outer link member 25 at a transversely outer end portion on the arm's front side; a front arm body 23*d* arranged between the front base portion 23*a* and the link lower support portion 23*c*; and a rear arm body 23*e* arranged between the rear base portion 23*b* and a link lower member. The rear arm body 23*e* includes a short arm 23*e*1 extending outwardly in the vehicle width direction from the rear base portion 23*b*; a longitudinal beam 23*e*2 arranged between a front end portion of the short arm 23*e*1 and an intermediate portion of the front arm body 23*d*; and an inclined beam 23*e*3 arranged between an intermediate portion of the longitudinal beam 23*e*2 and the link lower support portion 23*c*. On the outer side of the short arm 23*e*1 in the vehicle width direction, a shock absorber lower support arm 23*e*4 is provided in the manner of extending the short arm 23*e*1. More specifically, a rear end portion of the longitudinal beam 23*e*2 is connected to an intermediate portion of an arm body composed of the short arm 23*e*1 and the shock absorber lower support arm 23*e*4. A tip portion of the shock absorber lower support arm 23*e*4 is a shock absorber lower support portion 23*e*5. The longitudinal beams 23*e*2 form a closed loop together with the frame main body 6 (see FIG. 5), whereby the rigidity of the lower arm 23 in the transverse direction of the vehicle can be enhanced.

The front and rear base portions 23*a* and 23*b* are each formed in a hollow cylindrical shape parallel to and coaxial with the lower roll shaft 24. The lower roll shaft 24 is disposed to extend through the inside of the front and rear base portions 23*a* and 23*b*. In the present embodiment, the front and rear base portions 23*a*L and 23*b*L of the left lower arm 23L are aligned with the front and rear base portions 23*a*R and 23*b*R of the right lower arm 23R, so as to overlap with the latter from the rear side, and these base portions are supported by the frame main body 6 through the lower roll shaft 24. More specifically, as viewed in the axial direction of the lower roll shaft 24 (as viewed from the direction along the axis C3), the front and rear base portions 23*a*L and 23*b*L of the left lower arm 23L and the front and rear base portions 23*a*R and 23*b*R of the right lower arm 23R overlap with each other.

The left and right lower arms 23L and 23R are so configured that the front and rear base portions 23*a* and 23*b* on the left side differ from those on the right side in longitudinal-directional position, but that the link lower support portions 23*c* and the shock absorber lower support portions 23*e*5 on the left and right sides are the same in longitudinal-directional position. For this reason, the left and right lower arms 23L and 23R are formed in left-right asymmetry by making the front and rear arm bodies 23*d* and 23*e* different in a bent shape or the like.

Referring to FIG. 3, the distance from an axle center C5 of the front wheels 2L and 2R to transversely outer end portions 21*c*L and 21*c*R of the left and right upper arms 21L and 21R (the link upper support portions 21*c* which rotatably support the upper end portions of the outer link members 25) is denoted by symbol L1. The distance from the axle center C5 to transversely outer end portions 23*c*L and 23*c*R of the left and right lower arms 23L and 23R (the link lower support portions 23*c* which rotatably support the lower end portions of the outer link members 25) is denoted by symbol L2. The distance L1 means the distance from the axle center C5 to the centers of the upper outer swing shafts 25a at the transversely outer end portions 21cL and 21cR of the left and right upper arms 21L and 21R, as viewed in the axial direction of the upper and lower roll shafts 22 and 24 (as viewed in a direction along the axes C2 and C3). The distance L2 means the distance from the axle center C5 to the centers of the lower outer swing shafts 25b at the transversely outer end portions 23cL and 23cR of the left and right lower arms 23L and 23R, as viewed in the axial direction of the upper and lower roll shafts 22 and 24.

In the present embodiment, the distance L2 is smaller than the distance L1 (L2<L1). It is to be noted that the distance L2 may be greater than the distance L1. In other words, it is sufficient for the distance L1 and the distance L2 to be different from each other.

Figure 10:
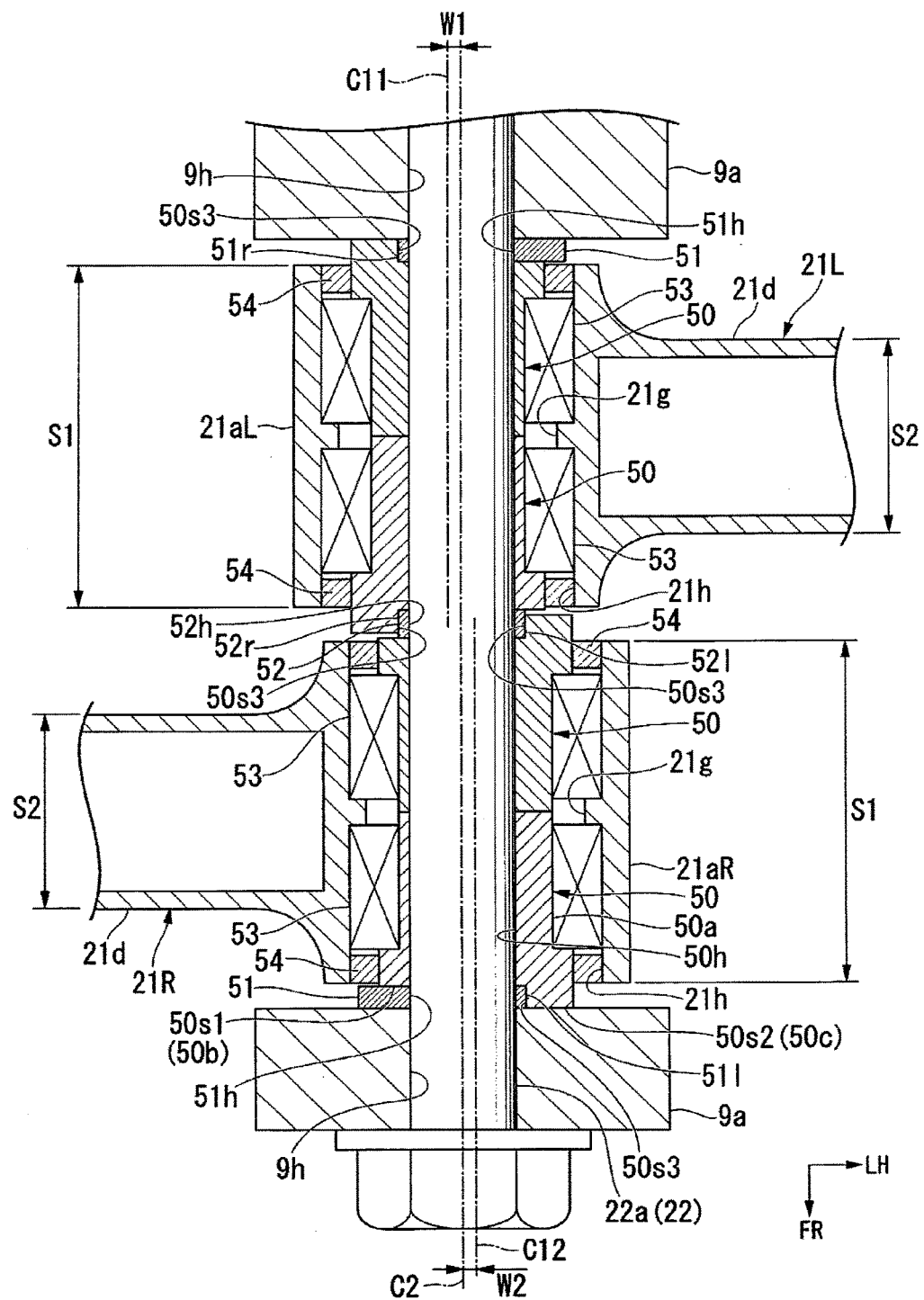
FIG. 10 is a view including a sectional view taken along line X-X of FIG. 2.
Figure 11:
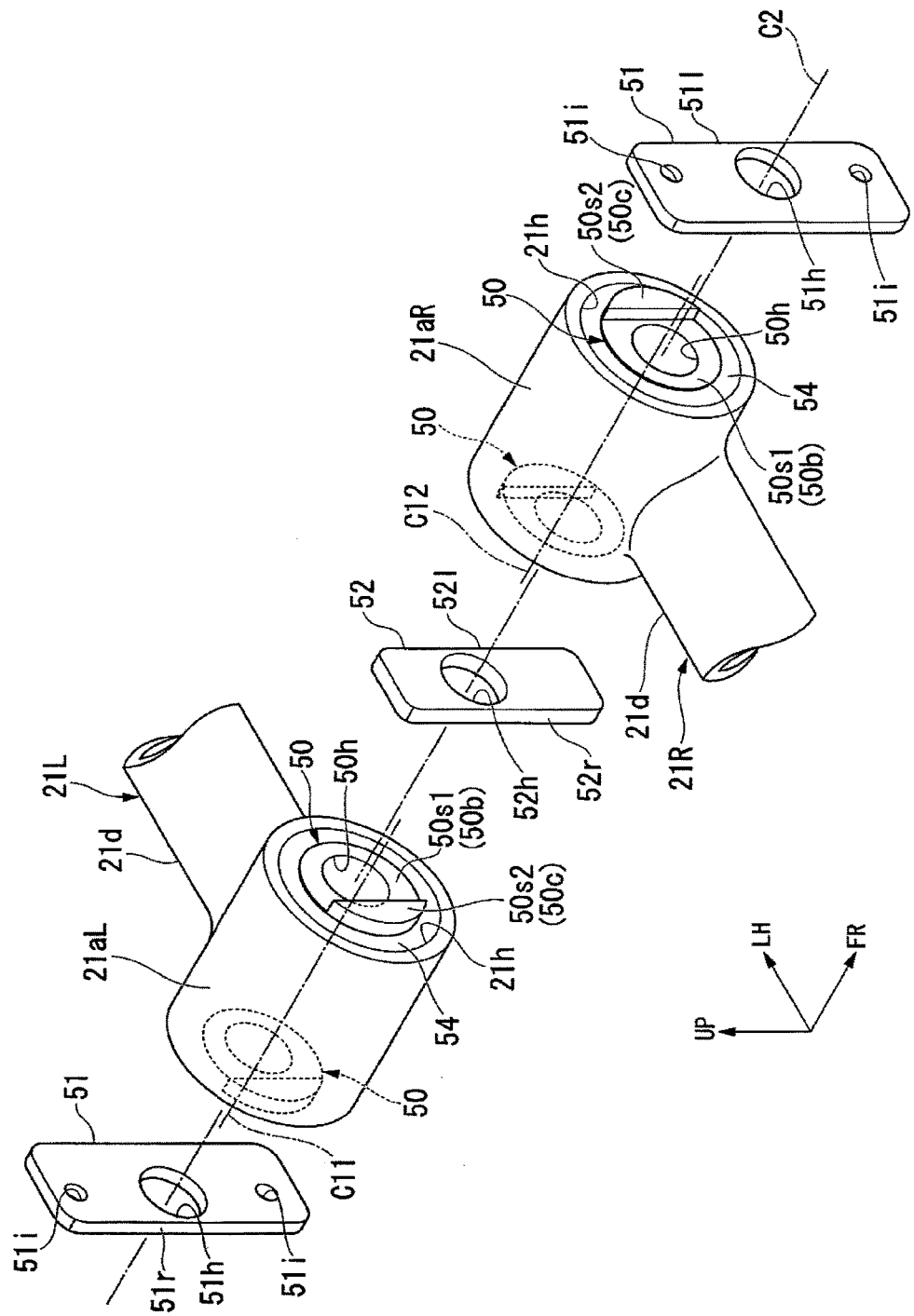
FIG. 11 is an exploded perspective view of left and right upper arms of the two-front-wheel suspension system.
Figure 12:
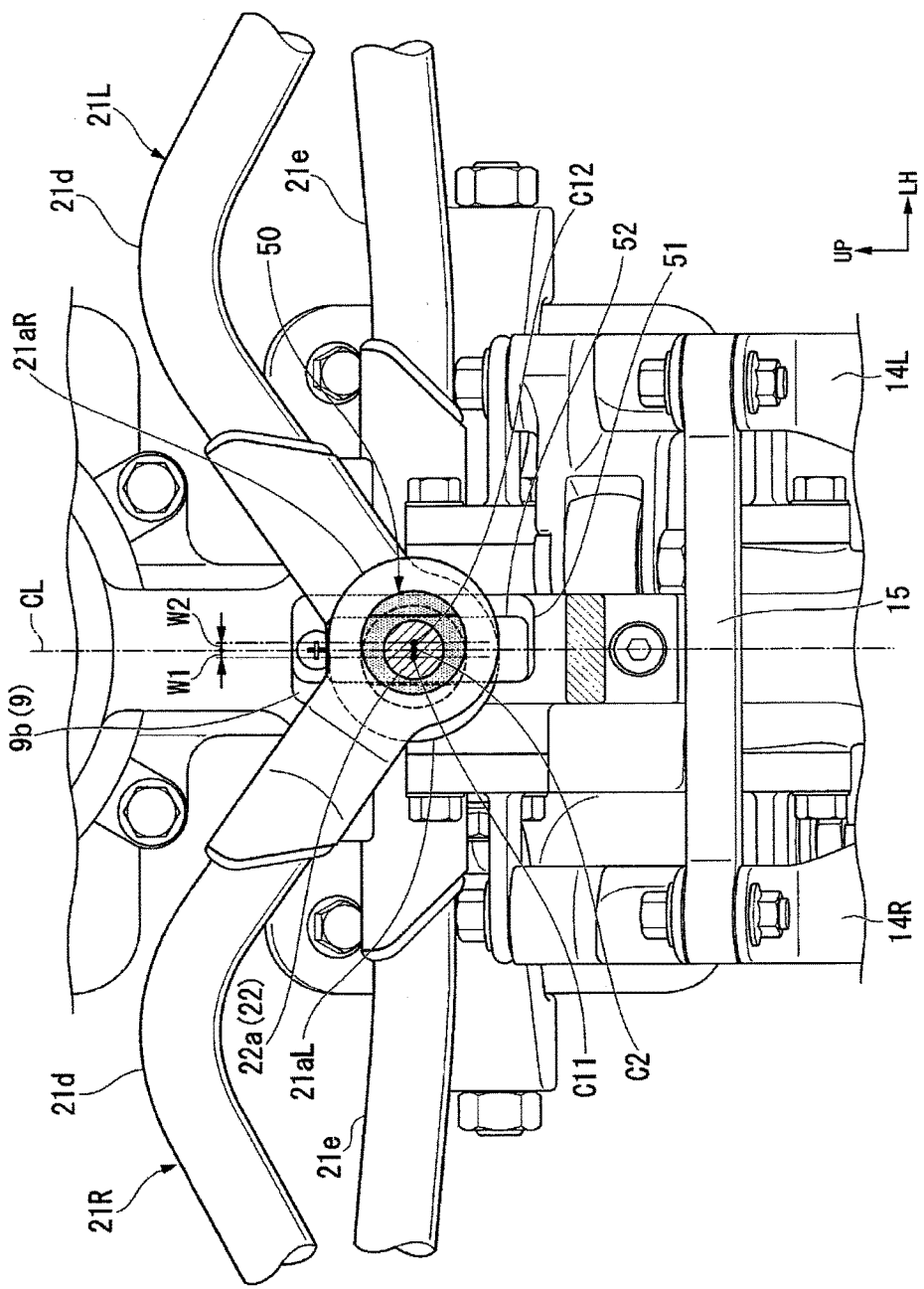
FIG. 12 is an enlarged view of FIG. 3.

Referring to FIGS. 10 to 12, in the present embodiment, as viewed in the axial direction of the upper and lower roll shafts 22 and 24, a center axis C11 of the front and rear base portions 21aL and 21bL of the left upper arm 21L (the swinging center axis of the left upper arm 21L) and a center axis C12 of the front and rear base portions 21aR and 21bR of the right upper arm 21R (the swinging center axis of the right upper arm 21R) are out of alignment with each other. More specifically, as viewed in the axial direction of the upper and lower roll shafts 22 and 24, the center axis C11 of the front and rear base portions 21aL and 21bL of the left upper arm 21L is disposed on the right side of the longitudinally extending vehicle body center line CL, whereas the center axis C12 of the front and rear base portions 21aR and 21bR of the right upper arm 21R is disposed on the left side of the longitudinally extending vehicle body center line CL.

It is to be noted that in the case where the distance L2 is greater than the distance L1, a center axis of the front and rear base portions 23aL and 23bL of the left lower arm 23L and a center axis of the front and rear base portions 23aR and 23bR of the right lower arm 23R may be out of alignment with each other, as viewed in the axial direction of the upper and lower roll shafts 22 and 24. More specifically, of the left and right upper arms 21L and 21R and the left and right lower arms 23L and 23R, those corresponding to the greater one of the distances L1 and L2 may have their swinging center axes out of alignment with each other, as viewed in the axial direction of the upper and lower roll shafts 22 and 24.

The front and rear base portions 21aL and 21bL of the left upper arm 21L and the front and rear base portions 21aR and 21bR of the right upper arm 21R are supported by eccentric collars 50 fitted to the same upper roll shaft 22.

A support structure for the front base portion 21aL of the left upper arm 21L and the front base portion 21aR of the right upper arm 21R, of the front and rear base portions 21aL and 21bL of the left upper arm 21L and the front and rear base portions 21aR and 21bR of the right upper arm 21R, will be described below referring to FIGS. 10 to 12. It is to be noted that a support structure for the rear base portion 21bL of the left upper arm 21L and the rear base portion 21bR of the right upper arm 21R is the same as the support structure for the front base portion 21aL of the left upper arm 21L and the front base portion 21aR of the right upper arm 21R. Therefore, a detailed description thereof is omitted.

The front base portions 21aL and 21aR of the left and right upper arms 21L and 21R extend in parallel to the axis C2 of the upper roll shaft 22, and have hollow cylindrical shapes centered on the center axes C11 and C12, respectively. Outer circumference portions of the front base portions 21aL and 21aR of the left and right upper arms 21L and 21R are integrally connected to transversely inner ends of the left and right front arm bodies 21d which extend along the vehicle width direction. The left and right front arm bodies 21d are hollow.

Referring to FIG. 10, a length S1 of the front base portions 21aL and 21aR of the left and right upper arms 21L and 21R extends along the axis C2 and a length S2 (outside diameter) of the left and right front arm bodies 21d extends along the axis C2. In the left and right upper arms 21L and 21R, the length S1 values of the left and right front base portions 21aL and 21aR are approximately equal, and the length S2 values of the left and right front arm bodies 21d are also approximately equal. In the present embodiment, the length S1 of the front base portions 21aL and 21aR is greater than the length S2 of the front arm bodies 21d (S1>S2). By this configuration, support rigidity of the left and right upper arms 21L and 21R with respect to the upper roll shaft 22a can be enhanced, as compared with the case where the length S1 of the front base portions 21aL and 21aR is equal to or smaller than the length S2 of the front arm bodies 21d.

The front base portions 21aL and 21aR of the left and right upper arms 21L and 21R are formed with circular insertion holes 21h which are opening in a direction along the axis C2 and which are centered on the center axes C11 and C12, respectively.

Front and rear plates 51 are disposed at the front of the front base portion 21aR of the right upper arm 21R and at the rear of the front base portion 21aL of the left upper arm 21L. An intermediate plate 52 is disposed between a rear portion of the front base portion 21aR of the right upper arm 21R and a front portion of the front base portion 21aL of the left upper arm 21L. Each of the plates 51 and 52 is formed in a plate-like form which has a rectangular shape elongated in a direction orthogonal to the axis C2 (in a vertical direction as viewed in the axial direction of the upper roll shaft 22 as depicted in FIG. 12) and which has a thickness in the direction along the axis C2.

The plates 51 and 52 are formed therein with circular insertion holes 51h and 52h which are opening in the direction along the axis C2 and which are centered on the axis C2. The insertion hole 51h in the front plate 51 is formed in a vertically intermediate portion of a plate main body on the left side with respect to the center in the transverse direction. The insertion hole 52h in the intermediate plate 52 is formed in a vertically intermediate portion of a plate main body in the center in the transverse direction. The insertion hole 51h in the rear plate 51 is formed in a vertically intermediate portion of a plate main body on the right side with respect to the center in the transverse direction.

The front and rear plates 51 are formed respectively with upper and lower insertion holes 51i for fixation to the upper arm front support portion 9a. The upper and lower insertion holes 51i are vertically spaced by a predetermined distance from the insertion hole 51h for insertion of the upper roll shaft 22a, are opening in the direction parallel to the axis C2, and have a circular shape smaller than that of the insertion hole 51h.

The front and rear plates 51 are fixed to the upper arm front support portion 9a by a bolt or the like extending through the insertion hole 51i from the rear side or front side along the axis C2. A bolt mounting portion of each of the front and rear plates 51 is formed with spot facing (not shown). For example, the depth of the spot facing (the maximum depth in the normal direction to a major surface of each of the front and rear plates 51) is so sized that when fixing the front and rear plates 51 to the upper arm front support portion 9*a* by a bolt or the like, the bolt head does not protrude from the major surface of each of the front and rear plates 51.

The support structure for the front base portion 21*a*L of the left upper arm 21L and the front base portion 21*a*R of the right upper arm 21R is as follows. In a state in which the front base portions 21*a*L and 21*a*R of the left and right upper arms 21L and 21R are disposed to be aligned in a front-rear relationship between a front portion and a rear portion of the upper arm front support portion 9*a*, the upper roll shaft 22*a* (bolt) is engaged with and fastened to a nut (not shown) through an insertion hole 9*h* in the upper arm front support portion 9*a* and the inner circumferences of the front base portions 21*a*L and 21*a*R of the left and right upper arms 21L and 21R.

On the outer circumference of the upper roll shaft 22*a*, there are provided, for example the eccentric collars 50 which support ball bearings 53 and in which the upper roll shaft 22*a* is inserted; and annular seal members 54 for ensuring sealing properties between the inner circumferences of the front base portions 21*a*L and 21*a*R of the left and right upper arms 21L and 21R and the outer circumferences of the eccentric collars 50. In the present embodiment, the ball bearings 53, the eccentric collars 50 and the seal members 54 are provided in twos aligned in a front-rear relationship along the axis C, respectively, in the front base portions 21*a*L and 21*a*R of the left and right upper arms 21L and 21R.

The front base portions 21*a*L and 21*a*R of the left and right upper arms 21L and 21R are swingably supported on the upper arm front support portion 9*a* through the upper roll shaft 22*a*, the plates 51 and 52, the eccentric collars 50, and the ball bearings 53. The upper roll shaft 22*a*, the plates 51 and 52, the eccentric collars 50, and inner races of the ball bearings 53 are stationarily supported on the upper arm front support portion 9*a*. The front base portions 21*a*L and 21*a*R of the left and right upper arms 21L and 21R are supported on the outer circumferences of the eccentric collars 50 so that they are swingable about the bearings.

At each of the inner circumferences of the front base portions 21*a*L and 21*a*R of the left and right upper arms 21L and 21R, an annular projection 21*g* projecting radially inwardly is integrally formed. Outer races of the ball bearings 53 abut on the projection 21*g* from the front and rear sides of the projection 21*g* along the axis C2, at the inner circumferences of the front base portions 21*a*L and 21*a*R of the left and right upper arms 21L and 21R. The eccentric collars 50 have their end faces (orthogonal to the axis C2) abutting on each other from the front and rear sides along the axis C2 at a position exposed to the projection 21*g*.

Each of the eccentric collars 50 integrally includes a hollow cylindrical cylinder portion 50*a* which extends in parallel to the axis C2 and has a center axis coinciding with the center axis C11 or C12; a head portion 50*b* which has a hollow cylindrical shape greater than the cylinder portion 50*a* in diameter and which has a bearing surface 50*s*1 making contact with the plates 51 and 52; and a projecting portion 50*c* which projects from a transversely one end side of the head portion 50*b* to a side opposite to the cylinder portion 50*a* and which has a semicircular bearing surface 50*s*2. For example, the eccentric collar 50 is made of metal, and the components of the eccentric collar 50 are integrally formed from the same material.

As viewed from the direction along the axis C2, the eccentric collar 50 provided at the front base portion 21*a*L of the left upper arm 21L has an outer circumferential surface eccentrically deviated to the right side from the axis C2. As viewed from the direction along the axis C2, the projecting portion 50*c* of the eccentric collar 50 provided at the front base portion 21*a*L of the left upper arm 21L projects to a side opposite to the cylinder portion 50*a*, on the right side of the axis C2.

On the other hand, as viewed from the direction along the axis C2, the eccentric collar 50 provided at the front base portion 21*a*R of the right upper arm 21R has an outer circumferential surface eccentrically deviated to the left side from the axis C2. As viewed from the direction along the axis C2, the projecting portion 50*c* of the eccentric collar 50 provided at the front base portion 21*a*R of the right upper arm 21R projects to a side opposite to the cylinder portion 50*a*, on the left side of the axis C2.

Referring to FIG. 10, a left side surface 51*l* of the front plate 51 makes contact with that surface 50*s*3 of the projecting portion 50*c* of the front eccentric collar 50 provided at the front base portion 21*a*R of the right upper arm 21R which is exposed to the axis C2. A left side surface 52*l* of the intermediate plate 52 makes contact with the surface 50*s*3 of the projecting portion 50*c* of the rear eccentric collar 50 provided at the front base portion 21*a*R of the right upper arm 21R which is exposed to the axis C2. A right side surface 52*r* of the intermediate plate 52 makes contact with that surface 50*s*3 of the projecting portion 50*c* of the front eccentric collar 50 provided at the front base portion 21*a*L of the left upper arm 21L which is exposed to the axis C2.

A right side surface 51*r* of the rear plate 51 makes contact with that surface 50*s*3 of the projecting portion 50*c* of the rear eccentric collar 50 provided at the front base portion 21*a*L of the left upper arm 21L which is exposed to the axis C2.

For example, when the plates 51 and 52 are fixed to the vehicle body 1A such as the upper arm front support portion 9*a*, rotation of the projecting portion 50*c* of each eccentric collar 50 about the axis C2 is restricted, so that each eccentric collar 50 can be restrained from slipping off about the axis C2.

The eccentric collar 50 is formed with a circular insertion hole 50*h* which is opening in the direction along the axis C2 and which is centered on the axis C2. As viewed from the direction along the axis C2, the center axes C11 and C12 of the eccentric collars 50 provided at the front base portions 21*a*L and 21*a*R of the left and right upper arms 21L and 21R are shifted from each other, with the axis C2 therebetween. More specifically, as viewed from the direction along the axis C2, the center axis C11 of the eccentric collar 50 provided at the front base portion 21*a*L of the left upper arm 21L is deviated to the right side of the axis C2. On the other hand, the center axis C12 of the eccentric collar 50 provided at the front base portion 21*a*R of the right upper arm 21R is deviated to the left side of the axis C2.

Referring to FIGS. 10 and 12, the deviation amount (the distance in the vehicle width direction) between the center axis C11 of the eccentric collar 50 provided at the front base portion 21*a*L of the left upper arm 21L and the axis C2 of the upper roll shaft 22*a* is denoted by symbol W1. In addition, the deviation amount (the distance in the vehicle width direction) between the center axis C12 of the eccentric collar 50 provided at the front base portion 21*a*R of the right upper arm 21R and the axis C2 of the upper roll shaft 22*a* is denoted by symbol W2. In the present embodiment, the deviation amount W1 between the center axis C11 and the axis C2 and the deviation amount W2 between the center axis C12 and the axis C2 is approximately equal, and are, for example, about 2 mm.

Referring to FIGS. 2, 3 and 6, the outer link member 25 extends substantially vertically. On the outer side of a lower portion of the outer link member 25, there is provided a knuckle support portion 25c having a gate-like shape opening to a transversely outer side in front view shown in FIG. 3. On the knuckle support portion 25c, a base portion 26a of the knuckle member 26 is steerably supported, through a steering shaft (kingpin shaft) 27 which is substantially parallel to the steering shaft 12 in side view. On the knuckle member 26, a front fender 2e is supported through front and rear stays 2f.

The knuckle member 26 integrally includes the base portion 26a supported by the outer link member 25; an axle support portion 26b provided at a vertically intermediate portion of the base portion 26a; an outer rod connection portion 26c provided forwardly of the axle support portion 26b; and caliper support portions 26d extending forward from upper and lower portions of the base portion 26a. On the axle support portion 26b, a hub 2b of the front wheel 2 is rotatably supported through an axle 28. A wheel 2a of the front wheel 2 is fastened and fixed to the outside of the hub 2b through a plurality of fastening portions 29 (see FIG. 1). At the outer circumference of the hub 2b, a brake rotor 2d is supported so as to be rotatable integrally with the hub 2b. The brake rotor 2d constitutes a front brake, on the basis of each of the left and right front wheels 2, together with a caliper 2c supported on the caliper support portion 26d.

In the front view shown in FIG. 3, center axes (kingpin axes) C9L and C9R of left and right kingpin shafts 27L and 27R are disposed as vertical lines which are offset equidistantly to the left and the right from the longitudinally extending vehicle body center line CL. In side view, on the other hand, the kingpin axes C9 are each disposed at an upwardly rearward inclination. It is to be noted that the kingpin axes C9 may be inclined in the front view in correspondence with the offset of the swinging center of the upper arms 21.

An intersection T1' of a downward extension line of the kingpin axis C9 with the road surface R in a side view is located forwardly of a grounding point T1 vertically under the axle center C5 of the front wheel 2, thereby generating a caster offset. The inclination angle of the kingpin axis C9 against the vertical direction in side view is the caster angle. The axle 28 of the front wheel 2 is offset to the front side of the kingpin axis C9 in side view.

Each of tires of the left and right front wheels 2L and 2R has a tread surface which is circular arc-shaped in section. At the time of banking (rolling) of the vehicle body, the left and right front wheels 2L and 2R are inclined similarly to the vehicle body due to the action of the two-front-wheel suspension system 4, whereby the grounding points are displaced sideways from the centers of the tread surfaces.

In this instance, since the length of the left and right tie rods 16L and 16R, the length of the left and right upper arms 21L and 21R, and the length of the left and right lower arms 23L and 23R are respectively equal, not any steering angle is generated even when the vehicle body is inclined.

Regulating means 60 (see FIG. 13) for regulating the turning angles of the front wheels 2L and 2R are provided between the link lower support portions 23c (which are transversely outer end portions of the left and right lower arms 23L and 23R) and the left and right knuckle members 26L and 26R. The left and right outer link members 25L and 25R are supported on the left and right link upper and lower support portions 21c and 23c so as to be swingable about the swing shafts 25a and 25b (swing axes C11 and C12). The left and right outer link members 25L and 25R support the knuckle members 26L and 26R in a steerable manner about the left and right kingpin shafts 27L and 27R (kingpin axes C9L and C9R) which intersect the left and right swing shafts 25a and 25b (swing axes C11 and C12), respectively.

Figure 13:
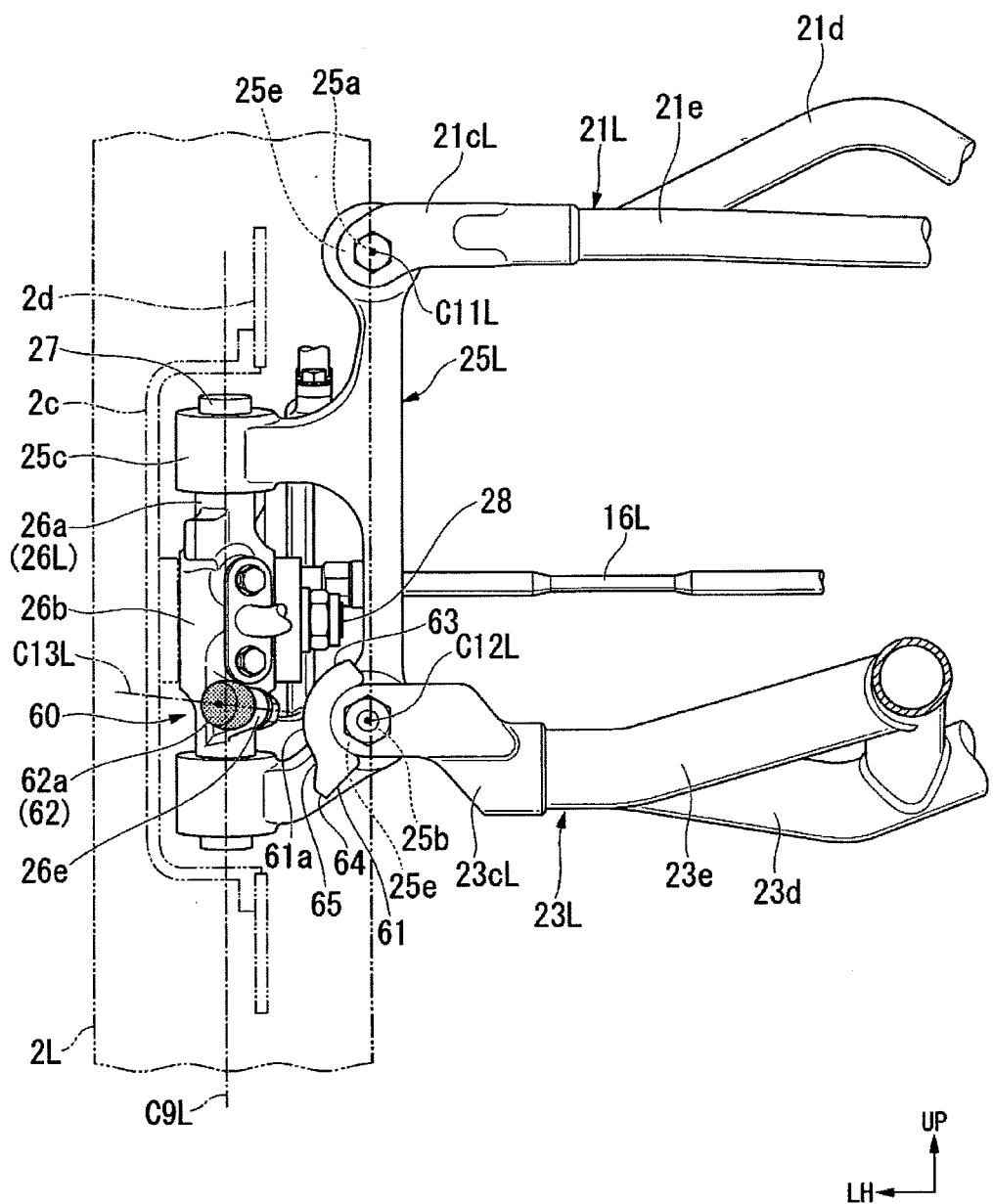
FIG. 13 is a view including a section along line XIII-XIII of FIG. 4 (a rear view as viewed from the axial direction of the upper and lower roll shafts)

In FIGS. 13 to 15 in the following, for convenience of explanation, the regulating means 60 between the link lower support portion 23c of the left lower arm 23L and the left knuckle member 26L will be described. It is to be noted that the regulating means 60 between the link lower support portion 23c of the right lower arm 23R and the right knuckle member 26R is equivalent to the regulating means 60 between the link lower support portion 23c of the left lower arm 23L and the left knuckle member 26L. Therefore, a detailed description thereof is omitted.

Referring to FIG. 13, the regulating means 60 includes a first regulation member 61 provided at an outer end portion of the link lower support portion 23c of the left outer link member 25L; and a second regulation member 62 provided at a roller support portion 26e on a rear lower side of the left knuckle member 26L. The first regulation member 61 is disposed so as to overlap with an insertion portion 25e for insertion of the swing shaft 25b of the left link lower support portion 23cL, as viewed from the direction along the swing shafts 25a and 25b (the swing axis C12L).

As the first regulation member 61, there is used a cam which regulates the turning angle of the front wheel 2L in conjunction with a variation in the swinging angle about the swing axis C12L. The second regulation member 62 includes the cam 61 overlapping with the insertion portion 25e, as viewed in the direction along the swing axis C12L and a hollow cylindrical roller 62a capable of rolling along the outer circumference 61a of the cam 61 (a cam protuberance located at a transversely outer end edge of the cam 61). The cam 61, by making contact with the roller 62a, rotates the roller 62a about an axis C13. It is to be noted that the axis C13 is gradually inclined so that a vehicle rear portion thereof is located on a left upper side, as viewed in the direction along the swing axis C12L, in an upright state of the vehicle body in which the left-right swinging angle is 0 degrees. In addition, in the upright state, the roller 62a is spaced apart to the transversely outer side from the outer circumference 61a of the cam 61.

The cam 61 is so formed as to reduce the turning angle of the front wheel 2L when the swinging angle about the swing axis C12L exceeds a predetermined angle. The outer circumference 61a of the cam 61 is formed in an S shape, as viewed in the direction along the swing axis C12L. More specifically, the outer circumference 61a of the cam 61 has an upper edge portion 63 having a circular arc shape centered on the swing axis C12L as viewed in the direction along the swing axis C12L; a lower edge portion 64 protruding to a left lower side while gradually curving from a lower end of the upper edge portion 63 toward a radially outer side of a circle centered on the swing axis C12L; and an intermediate edge portion 65 located in a vertically intermediate area (boundary area) between the upper edge portion 63 and the lower edge portion 64.

Referring to FIGS. 2, 3 and 6, the shock absorber unit 31 includes a rod-type damper 32 extending substantially vertically, and a coil spring 33 wound around the damper 32. The shock absorber unit 31 is so inclined that its upper portion is located on the rear side with respect to the vertical direction in side view, and is disposed so as to extend orthogonally to the upper and lower roll shafts 22 and 24 in side view. In addition, the shock absorber unit 33 is disposed substantially vertically in front view shown in FIG. 3. It is to be noted that the shock absorber unit 31 may be inclined in front view correspondingly to the offset of the swinging center of the upper arms 21.

Referring to FIGS. 4 and 5, as viewed in the axial direction of the steering shaft 12, the turning trajectories KL and KR of the left and right front wheels 2L and 2R are in the shape of circular arcs centered on the center axes (kingpin axes) C9L and C9R of the left and right kingpin shafts 27L and 27R. As viewed in the axial direction of the steering shaft 12, the left and right shock absorber units 31L and 31R are disposed on the outer circumference sides of the turning trajectories KL and KR of the left and right front wheels 2L and 2R, namely, on the radially outer sides of the circles centered on the kingpin axes C9L and C9R.

An upper end portion of the shock absorber unit 31 is connected to a shock absorber upper support portion 44b of the shock absorber support arm 44 through an upper connection shaft 44c. A lower end portion of the shock absorber unit 31 is connected to the shock absorber lower support portion 23e5 of the lower arm 23 through a lower connection shaft 23e6. A center axis C6 (stroke axis) of the damper 32 of the shock absorber unit 31 is provided. Referring to FIGS. 1, 2 and 3, the stroke axes C6L and C6R of the left and right shock absorber units 31L and 31R are disposed rearwardly of rear ends of the left and right front wheels 2L and 2R.

On one end side in the radial direction of an upper end portion of the shock absorber unit 31, a holder 35 for holding a sub tank 34 of the damper 32 is integrally provided. The sub tank 34 is provided in the form of a hollow cylinder which is located on an outer circumference side of an upper portion of the shock absorber unit 31 and is parallel to the stroke axis. In the present embodiment, the sub tank 34 of the shock absorber unit 31 in the state of being mounted to the vehicle body is disposed on a transversely outer side of a shock absorber main body including the damper 32 and the coil spring 33. Referring to FIGS. 4 and 5, the sub tanks 34 of the left and right shock absorber units 31L and 31R are on the outer circumference sides of the turning trajectories KL and KR of the left and right front wheels 2L and 2R, namely, on the radially outer sides of the circles centered on the kingpin axes C9L and C9R, as viewed in the axial direction of the steering shaft 12. For example, the sub tank 34 is a reservoir tank for the shock absorber unit 31.

The shock absorber unit 31 strokes between the lower arm 23 and the shock absorber support arm 44 in response to an input of shock or the like to the front wheel 2, thereby to absorb the shock or the like inputted to the front wheel 2 and to attenuate vertical movements of the front wheel 2. The shock absorber unit 31 is disposed forwardly of the engine 3 and rearwardly of the front wheel 2 in side view. Referring to FIGS. 4 and 5, the left and right shock absorber units 31L and 31R are disposed within the transverse width of the engine 3, as viewed in the axial direction of the steering shaft 12, and are disposed adjacent to a front portion of the engine 3.

The shock absorber support arm 44 is provided in an integral form obtained, for example, by integral forming of a metallic material. The shock absorber support arm 44 integrally has the left and right arm portions 44aL and 44aR at left and right outer sides of the base portion 45, and integrally has the rear swing arm 46 upwardly of the base portion 45. The left and right arm portions 44aL and 44aR are provided at outer ends thereof with the shock absorber upper support portions 44b which support upper end portions of the left and right shock absorber units 31L and 31R. On the shock absorber upper support portions 44b, upper end portions of the left and right shock absorber units 31L and 31R are respectively supported through the upper connection shafts 44c which are parallel to the shock absorber swing shaft 45a. The left and right arm portions 44aL and 44aR extend from left and right outer sides of the base portion 45 (supported on the vehicle body 1A in a swingable manner) while being displaced toward left and right outer rear sides, respectively, and reach the shock absorber upper support portions 44b while assuming a crank-like form as viewed in the axial direction of the steering shaft 12 as shown in FIG. 4. The center axis of the shock absorber swing shaft 45a (the swinging center of the shock absorber support arms 44) is denoted by symbol C8.

Referring to FIGS. 4, 6 and 7, the steering link mechanism 17 is disposed at a position spaced forward from the steering shaft 12. The steering link mechanism 17 includes: a front link member 15 extending in the transverse direction; and left and right link members 14L and 14R extending rearward from left and right end portions of the front link member 15. Each of base end portions 14a as rear end portions of the left and right link members 14L and 14R is connected to the link support portion 9c of the front suspension frame body 5 in a rotatable manner through a rear link rotating shaft 14c extending substantially in parallel to the kingpin axis C9 in side view. To front end portions of the left and right link members 14L and 14R, left and right end portions of the front link member 15 are connected in a rotatable manner through front link rotating shafts 14b parallel to the rear link rotating shafts 14c.

Under longitudinally intermediate portions of the left and right link members 14L and 14R, inner rod connection portions 14d for connecting inner end portions of the left and right tie rods 16L and 16R are provided in a projecting form. Outer end portions of the left and right tie rods 16L and 16R are connected to the outer rod connection portions 26c of the left and right knuckle members 26L and 26R. Spherical bearings 16a and 16b are provided respectively at the inner and outer end portions of the left and right tie rods 16L and 16R. The inner and outer end portions of the left and right tie rods 16L and 16R are connected to the inner and outer rod connection portions 14d and 26c through these spherical bearings 16a and 16b by, for example, bolts inserted from the front side.

In one (in FIGS. 7(a) to 7(c), the left link member 14L) of the left and right link members 14L and 14R, a connection arm 14f for connecting a front end portion of the link rod 13 is provided in a projecting manner at the base end portion 14a supported by the front suspension frame body 5. Spherical bearings 13a and 13b are provided respectively at front and rear end portions of the link rod 13. The front and rear end portions of the link rod 13 are connected to the connection arm 14f and the bottom bracket 12a through these spherical bearings 13a and 13b respectively by, for example, bolts inserted from the upper side or the lower side.

The bottom bracket 12a, the connection arm 14f and the link rod 13 constitute a substantially parallel link as viewed in the axial direction of the steering shaft 12, and interlocks rotation of the steering handlebar 11 with rotation of the left link member 14L. In addition, when the left link member 14L is rotated, the right link member 14R is also rotated through the front link member 15.

The steering link mechanism 17 exhibits an equivalent action to that of an Ackerman mechanism. More specifically, when the left and right front wheels 2L and 2R are steered through the steering link mechanism 17, the steering angle of the front wheel 2 on the inner wheel side of the left and right front wheels 2L and 2R becomes greater than the steering angle of the front wheel 2 on the outer wheel side.

For instance, as viewed in the axial direction of the steering shaft 12 (see FIGS. 7(b) and 7(c)), the connection positions between the inner end portions of the left and right tie rods 16L and 16R and the inner rod connection portions 14d of the left and right link members 14L and 14R are set at positions deviated from the axes of the left and right link members 14L and 14R, whereby the steering characteristics of the left and right front wheels 2L and 2R can be changed. More specifically, as shown in FIGS. 7(b) and 7(c), as viewed in the axial direction of the steering shaft 12, the connection positions between the inner end portions of the left and right tie rods 16L and 16R and the inner rod connection portions 14d of the left and right link members 14L and 14R are located on the transversely inner sides of the axes of the left and right link members 14L and 14R. Therefore, the Ackerman percentage can be set higher. More specifically, the steering angle of the front wheel 2 on the inner wheel side of the left and right front wheels 2L and 2R can be set larger than the steering angle of the front wheel 2 on the outer wheel side. Consequently, desired turning characteristics can be obtained. The "Ackerman percentage" means a ratio concerning the steering angles of the left and right front wheels 2L and 2R at the time of turning (cornering).

Figure 15C:
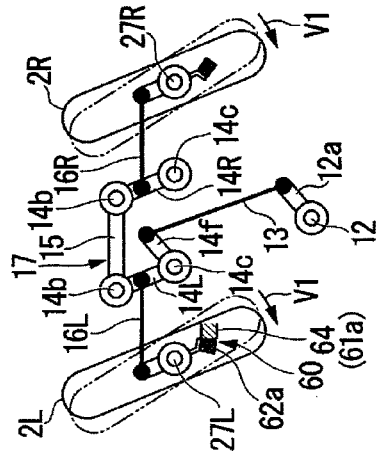
FIGS. 15(a), 15(b) and 15(c) illustrates the steering link mechanism of the two-front-wheel suspension system at the time of steering to the left, wherein 15(a) depicts a state when the vehicle body is upright, 15(b) depicts a state when the vehicle body rolls to the left (a state at the time of banking at a bank angle slightly shallower than a full-bank state), and 15(c) depicts a state when the vehicle body rolls to the left (a substantially full-bank state)
Figure 15B:
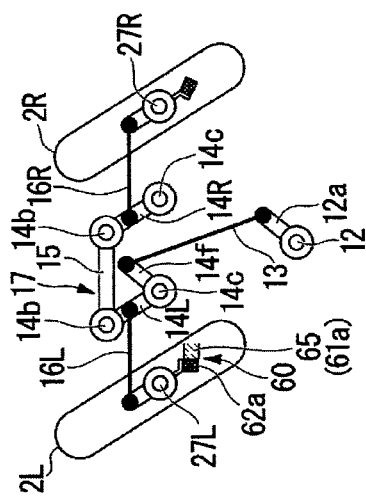
Figure 15A:
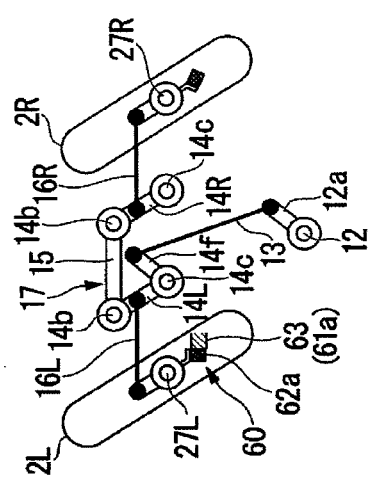

In FIGS. 15(a) to 15(c), for convenience of explanation, there is shown a case where the Ackerman percentage is 0, or where the connection positions between the inner end portions of the left and right tie rods 16L and 16R and the inner rod connection portions 14d of the left and right link members 14L and 14R are located on the axes of the left and right link members 14L and 14R as viewed in the axial direction of the steering shaft 12.

As aforementioned, the cam 61 (first regulation member) is so formed as to reduce the turning angle of the front wheel 2L when the swinging angle about the swing axis C12L exceeds a predetermined angle.

Figures 14A, 14B, 14C:
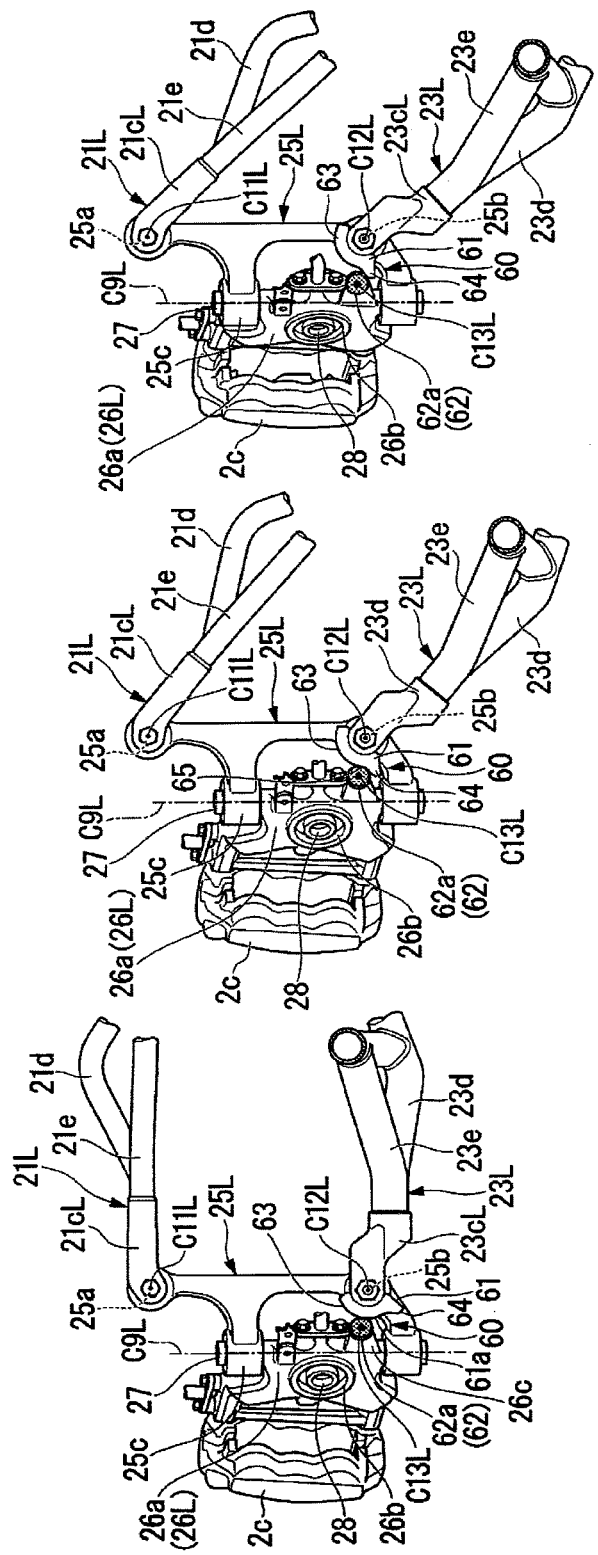
FIGS. 14(a), 14(b) and 14(c) shows rear views of the two-front-wheel suspension system along the upper and lower roll shafts at the time of steering to the left, wherein 14(a) depicts a state when the vehicle body is upright, 14(b) depicts a state when the vehicle body rolls to the left (a state at the time of banking at a bank angle slightly shallower than a full-bank state), and 14(c) depicts a state when the vehicle body rolls to the left (a substantially full-bank state)

Referring to FIGS. 14(a) and 15(a), when the left and right front wheels 2L and 2R are steered to the left side through the steering link mechanism 17 in a condition in which the vehicle body is upright, the upper edge portion 63 of the outer circumference 61a and the roller 62a contact each other. See FIG. 14(a) and FIG. 15(a). By this, direct contact between the vehicle body 1A and the front wheels 2L and 2R is avoided.

When the left and right front wheels 2L and 2R are steered to the left side through the steering link mechanism 17 in a state in which the vehicle body is banking to such an extend as not to reach full banking (a state of banking at a bank angle slightly shallower than that at full banking), the intermediate edge portion 65 located at the vertically intermediate portion (boundary) between the upper edge portion 63 and the lower edge portion 64 of the outer circumference 61a and the roller 62a contact each other. See FIG. 14(b) and FIG. 15(b). Up to this point, the steering angle is constant at full steering.

When the left and right front wheels 2L and 2R are steered to the left side through the steering link mechanism 17 in a substantially full banking state of the vehicle body, the lower edge portion 64 of the outer circumference 61a and the roller 62a contact each other. See FIG. 14(c) and FIG. 15(c). By this, the steering angle of the left front wheel 2L is limited to a steering angle smaller than that at the full steering. In addition, the steering angle of the right front wheel 2R is also limited similarly through the steering link mechanism 17.

In the present embodiment, in order to ensure that the steering angles of the front wheels 2L and 2R are varied according to the roll angle (bank angle), the moving trajectory of the roller 62a is set to be along the circular arc centered on the swing axis C12L, as viewed from the direction along the swing axis C12L, in a range from an upright state of the vehicle body to a shallow bank angle. On the other hand, in a range from the shallow bank angle to the full banking, the moving trajectory of the roller 62a is set to go toward a left lower side (the direction of arrow V1 in FIG. 15(c)) while gently curving toward the radially outer side of the circle centered on the swing axis C12L. It is to be noted that the configuration in which the steering angle is set constant at full steering up to an intermediate point in the course is not limitative, and the steering angle may be regulated by varying the cam profile, for example, gradually varying the outer circumference 61a of the cam 61.

As has been described above, in the above embodiment, the rolling type vehicle 1 which has the pair of left and right front wheels 2L and 2R and in which the vehicle body 1A is capable of rolling includes the pairs of left and right upper arms 21 and lower arms 23 (arm members) which are supported in a swingable manner by the vehicle body 1A on inner sides in the transverse direction and which support the left and right front wheels 2L and 2R in a steerable manner on outer sides in the transverse direction, respectively. As viewed from the direction along the axes C2 and C3 of the upper and lower roll shafts 22 and 24 (support shafts) support the left and right upper arms 21 and lower arms 23 on the vehicle body 1A. The base portions 21a, 21b, 23a, and 23b of the left and right upper arms 21 and lower arms 23 are rotatably supported on the vehicle body 1A side and overlap with each other. The center axis C11 (swinging center axis) of the base portions 21aL and 21bL of the left upper arm 21L (left arm) and the center axis C12 (swinging center axis) of the base portions 21aR and 21bR of the right upper arm 21R (right arm), of the base portions 21a, 21b, 23a, and 23b of the left and right upper arms 21 and lower arms 23, are out of alignment with each other (do not coincide with each other).

Owing to this configuration wherein the base portions 21a, 21b, 23a, and 23b of the left and right upper arms 21 and lower arms 23 which are rotatably supported on the vehicle body 1A side overlap with each other and wherein the center axis C11 of the base portions 21aL and 21bL of the left upper arm 21L and the center axis C12 of the base portions 21aR and 21bR of the right upper arm 21R, of the base portions 21a, 21b, 23a, and 23b of the left and right upper arms 21 and the lower arms 23, are out of alignment with each other, as viewed from the direction along the axes C2 and C3, it is ensured that the positions of the center axes C11 and C12 of the base portions of the left and right upper arms 21L and 21R can be set more freely within a range in which the base portions 21a and 21b of the upper arms 21 overlap with each other as viewed in the direction along the axis C2, as compared with the case where the center axis C11 of the base portions 21aL and 21bL of the left upper arm 21L and the center axis C12 of the base portions 21aR and 21bR of the right upper arm 21 are coincident with each other as viewed from the direction along the axes C2 and C3. As a result, the length of the left and right arms (the length of the left and right upper arms 21L and 21R in the vehicle width direction) can be enlarged while enhancing the degree of freedom of layout.

In addition, in the above embodiment wherein the center axis C11 of the left upper arm 21L is disposed on the right side of the longitudinally extending vehicle body center axis CL whereas the center axis C12 of the right upper arm 21R is disposed on the left side of the longitudinally extending vehicle body center line CL, the length of the left and right arms can be enlarged effectively, as compared with the case where the center axis C11 of the left upper arm 21L is disposed on the left side of the longitudinally extending vehicle body center line CL whereas the center axis C12 of the right upper arm 21R is disposed on the right side of the longitudinally extending vehicle body center line CL. Further, it is possible to reduce the length of the upper arms 21 in the vehicle width direction (the whole width) and thus, to reduce the vehicle width, as compared with the case where the center axis C11 is disposed on the left side of the longitudinally extending vehicle body center line CL whereas the center axis C12 is disposed on the right side of the longitudinally extending vehicle body center line CL.

In the above embodiment wherein the center axes C11 and C12 of those ones of the left and right upper arms 21L and 21R (upper arms) and left and right lower arms 23L and 23R (lower arms) which correspond to the greater one of the distances L1 and L2 are out of alignment with each other, as viewed from the direction along the axes C2 and C3, it is ensured that a clearance can be secured between those ones of the left and right upper arms 21L and 21R and the left and right lower arms 23L and 23R which are more liable to interfere with component parts surrounding the front wheels 2L and 2R at the time of swinging of the arms and the surrounding component parts. Consequently, interference among vehicle component parts can be effectively avoided.

Further, in the above embodiment wherein the distance L2 for the lower arms 23 is set smaller than the distance L1 for the upper arms 21, it is easier to secure a minimum road clearance as compared with the case where the distance L2 for the lower arm 23 is set greater than the distance L1 for the upper arms 21. In addition, with the center axes C11 and C12 of the left and right upper arms 21L and 21R being set out of alignment with each other as viewed from the direction along the axis C2, clearance can be secured between the left and right upper arms 21L and 21R liable to interfere with component parts surrounding the front wheels 2L and 2R at the time of swinging of the arms and the surrounding component parts. Therefore, interference among vehicle component parts can be obviated effectively. Consequently, interference among vehicle component parts can be avoided effectively while securing a minimum road clearance.

In the above embodiment wherein the base portions 21aL and 21bL of the left upper arm 21L and the base portions 21aR and 21bR of the right upper arm 21R are supported by the eccentric collars 50 fitted to the same roll shaft 22 (support shaft), it is ensured that the length of the left and right arms can be enlarged by just a required amount without causing an increase in weight, as compared with the case where the number of swing shafts is increased by, for example, providing the swing shafts on the basis of each of the left upper arm 21L and the right upper arm 21R.

It is to be noted that while the above embodiment has been described by showing an example in which the actuator 41 and the shock absorber support arm 44 are interlocked with each other through an interlock mechanism such as the connection link 48, this is not restrictive. For instance, the actuator and the shock absorber support arm may be disposed coaxially with each other.

Figure 16:
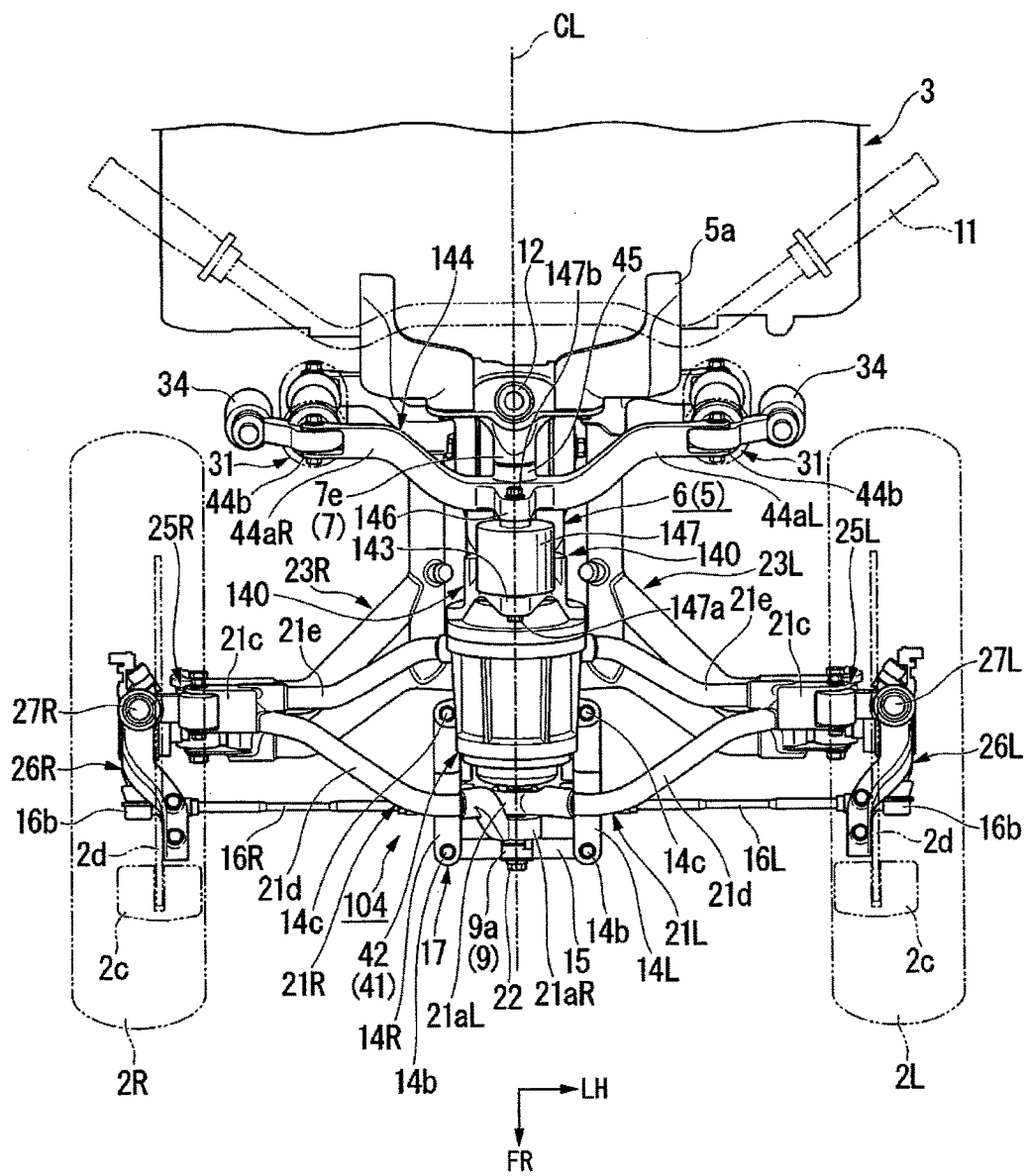
FIG. 16 is a top plan view corresponding to FIG. 4, showing a two-front-wheel suspension system according to a modification of the embodiment as viewed from an axial direction of a steering shaft.
Figure 17:
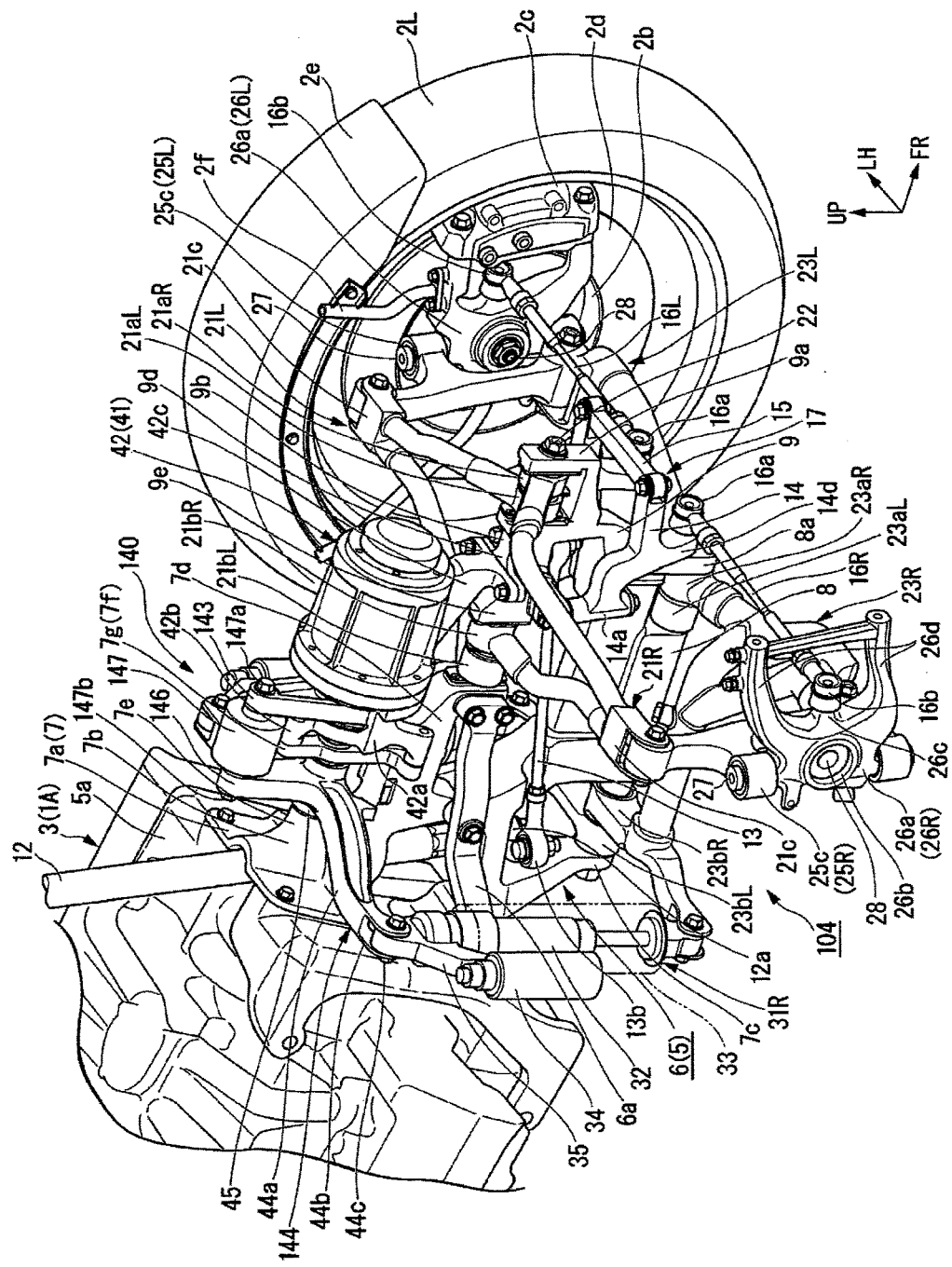
FIG. 17 is a perspective view, corresponding to FIG. 6, of the two-front-wheel suspension system according to the modification.

A two-front-wheel suspension system 104 according to a modification of the embodiment will be described below, referring to FIGS. 16 and 17. In FIGS. 16 and 17, components equivalent to the components in the above embodiment are denoted by the same symbols as used above, and detailed descriptions of them are omitted.

Referring to FIGS. 16 and 17, in the two-front-wheel suspension system 104 according to the modification, at a rear portion of the actuator 41, there is provided a front swing arm 143 projecting upward and adapted to swing about the axis C7. The front swing arm 143 is fixed to the driving shaft 41a of the actuator 41 and swings about the axis C7. The front swing arm 143 is opposed to a rear swing arm 146 of a shock absorber support arm 144 with a spacing therebetween along the axial direction of the actuator 41. More specifically, as viewed from the axis C8, a tip portion 143b of the front swing arm 143 (a connection portion between a connection device 147 and the front swing arm 143) is opposed to a tip portion 146b of the rear swing arm 146 (a connection portion between the connection device 147 and the rear swing arm 146) with an interval therebetween. At a connection portion 140 between the front swing arm 143 and the rear swing arm 146, there is provided the connection device 147 (load detection unit) which enables them to swing as one body. The connection device 147 functions also as a load detection unit which detects a load transmitted between the front and rear swing arms 143 and 146.

The connection device 147 is, for example, in the form of a hollow cylinder parallel to the shock absorber swing shaft 45a. Bolts 147a and 147b penetrating tip portions of the front and rear swing arms 143 and 146 from the front side or the rear side are engaged to central portions of front and rear ends of the connection device 147, whereby the connection device 147 is fastened and fixed to the tip portions of the front and rear swing arms 143 and 146. The connection device 147 incorporates therein a load sensor adapted to electrically detect a load (torque) about the shock absorber swing shaft 45a which is generated between the front and rear swing arms 143 and 146. A detected value of the load (torque) is inputted to an ECU (not shown) adapted to control the operation of the actuator 41.

The load about the shock absorber swing shaft 45a which is generated between the front and rear swing arms 143 and 146 is generated according to an operation resistance (torque) of the front swing arm 143 when the shock absorber support arm 144 is about to swing relative to the actuator 41 which is supported on the vehicle body side. More specifically, when the vehicle body rolls, a load about the shock absorber swing shaft 45a is generated between the front and rear swing arms 143 and 146, according to the operation resistance of the front swing arm 143. The ECU controls the driving of the actuator 41 according to the detected value of the load. The swinging center (axis C7) of the front swing arm 143 of the actuator 41 and the swinging center (axis C8) of the rear swing arm 146 of the shock absorber support arm 144 are coaxially with each other, whereby an interlock mechanism between them is made simple and compact.

It is to be noted that the present invention is not limited to the above embodiment. For example, the application of the present invention is not limited to a three-wheeled vehicle having left and right front wheels and a single rear wheel, and the invention may be applied to a four-wheeled vehicle having left and right front wheels and left and right rear wheels.

The configuration in the above embodiment is mere an example of the present invention and various modifications are possible without departing from the spirit or scope of the present invention, such as by replacing a component of the embodiment with a known component.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A rolling vehicle having a pair of left and right front wheels and having a vehicle body capable of rolling, the rolling type vehicle comprising:
    a pair of left and right arm members swingably supported on the vehicle body on inner sides in a transverse direction for supporting the left and right front wheels in a steerable manner on outer sides in the transverse direction;
    wherein as viewed from a direction along an axis of a support shaft for supporting the left and right arm members on the vehicle body, the base portions of the left and right arm members which are rotatably supported on the vehicle body side overlap with each other, whereas a swinging center axis of the base portion of the left arm and a swinging center axis of the base portion of the right arm, of the base portions of the left and right arm members, are out of alignment with each other.

2. The rolling vehicle according to claim 1, wherein the swinging center axis of the left arm is disposed on the right side of a longitudinally extending vehicle body center line, while the swinging center axis of the right arm is disposed on the left side of the longitudinally extending vehicle body center line.

3. The rolling vehicle according to claim 1, wherein the left and right arm members each include an upper arm and a lower arm;
    the distance from an axle center of the front wheel to a transversely outer end portion of the upper arm and the distance from the axle center to a transversely outer end portion of the lower arm are different from each other; and
    the swinging center axes of those ones of the upper arms and the lower arms which correspond to the greater one of the distances are deviated from each other in transverse direction, as viewed from a direction along the axis of the support shaft.

4. The rolling vehicle according to claim 2, wherein the left and right arm members each include an upper arm and a lower arm;
    the distance from an axle center of the front wheel to a transversely outer end portion of the upper arm and the distance from the axle center to a transversely outer end portion of the lower arm are different from each other; and
    the swinging center axes of those ones of the upper arms and the lower arms which correspond to the greater one of the distances are deviated from each other in transverse direction, as viewed from a direction along the axis of the support shaft.

5. The rolling vehicle according to claim 3, wherein the distance for the lower arm is set smaller than the distance for the upper arm; and
    the swinging center axes of the left and right upper arms are out of alignment with each other, as viewed from a direction along the axis of the support shaft.

6. The rolling vehicle according to claim 4, wherein the distance for the lower arm is set smaller than the distance for the upper arm; and
    the swinging center axes of the left and right upper arms are out of alignment with each other, as viewed from a direction along the axis of the support shaft.

7. The rolling vehicle according to claim 1, wherein the base portion of the left arm and the base portion of the right arm are supported by eccentric collars fitted on the same support shaft.

8. The rolling vehicle according to claim 2, wherein the base portion of the left arm and the base portion of the right arm are supported by eccentric collars fitted on the same support shaft.

9. The rolling vehicle according to claim 3, wherein the base portion of the left arm and the base portion of the right arm are supported by eccentric collars fitted on the same support shaft.

10. The rolling vehicle according to claim 5, wherein the base portion of the left arm and the base portion of the right arm are supported by eccentric collars fitted on the same support shaft.

11. A suspension system for a vehicle comprising:
    a pair of left and right arm members swingably supported on a vehicle body on inner sides in a transverse direction for supporting left and right front wheels in a steerable manner on outer sides in the transverse direction;
    wherein as viewed from a direction along an axis of a support shaft for supporting the left and right arm members on the vehicle body, the base portions of the left and right arm members which are rotatably supported on the vehicle body side overlap with each other, whereas a swinging center axis of the base portion of the left arm and a swinging center axis of the base portion of the right arm, of the base portions of the left and right arm members, are out of alignment with each other.

12. The suspension system for a vehicle according to claim 11, wherein the swinging center axis of the left arm is disposed on the right side of a longitudinally extending vehicle body center line, while the swinging center axis of the right arm is disposed on the left side of the longitudinally extending vehicle body center line.

13. The suspension system for a vehicle according to claim 11, wherein the left and right arm members each include an upper arm and a lower arm;
    the distance from an axle center of the front wheel to a transversely outer end portion of the upper arm and the distance from the axle center to a transversely outer end portion of the lower arm are different from each other; and
    the swinging center axes of those ones of the upper arms and the lower arms which correspond to the greater one of the distances are deviated from each other in transverse direction, as viewed from a direction along the axis of the support shaft.

14. The suspension system for a vehicle according to claim 12, wherein the left and right arm members each include an upper arm and a lower arm;
    the distance from an axle center of the front wheel to a transversely outer end portion of the upper arm and the distance from the axle center to a transversely outer end portion of the lower arm are different from each other; and
    the swinging center axes of those ones of the upper arms and the lower arms which correspond to the greater one of the distances are deviated from each other in transverse direction, as viewed from a direction along the axis of the support shaft.

15. The suspension system for a vehicle according to claim 13, wherein the distance for the lower arm is set smaller than the distance for the upper arm; and the swinging center axes of the left and right upper arms are out of alignment with each other, as viewed from a direction along the axis of the support shaft.

16. The suspension system for a vehicle according to claim 14, wherein the distance for the lower arm is set smaller than the distance for the upper arm; and the swinging center axes of the left and right upper arms are out of alignment with each other, as viewed from a direction along the axis of the support shaft.

17. The suspension system for a vehicle according to claim 11, wherein the base portion of the left arm and the base portion of the right arm are supported by eccentric collars fitted on the same support shaft.

18. The suspension system for a vehicle according to claim 12, wherein the base portion of the left arm and the base portion of the right arm are supported by eccentric collars fitted on the same support shaft.

19. The suspension system for a vehicle according to claim 13, wherein the base portion of the left arm and the base portion of the right arm are supported by eccentric collars fitted on the same support shaft.

20. The suspension system for a vehicle according to claim 15, wherein the base portion of the left arm and the base portion of the right arm are supported by eccentric collars fitted on the same support shaft.

* * * * *